Aug. 2, 1949.  R. ANDERSON  2,477,562
ORTHOPEDIC TABLE AND FRACTURE REDUCING APPARATUS
Filed Oct. 17, 1945  14 Sheets-Sheet 1
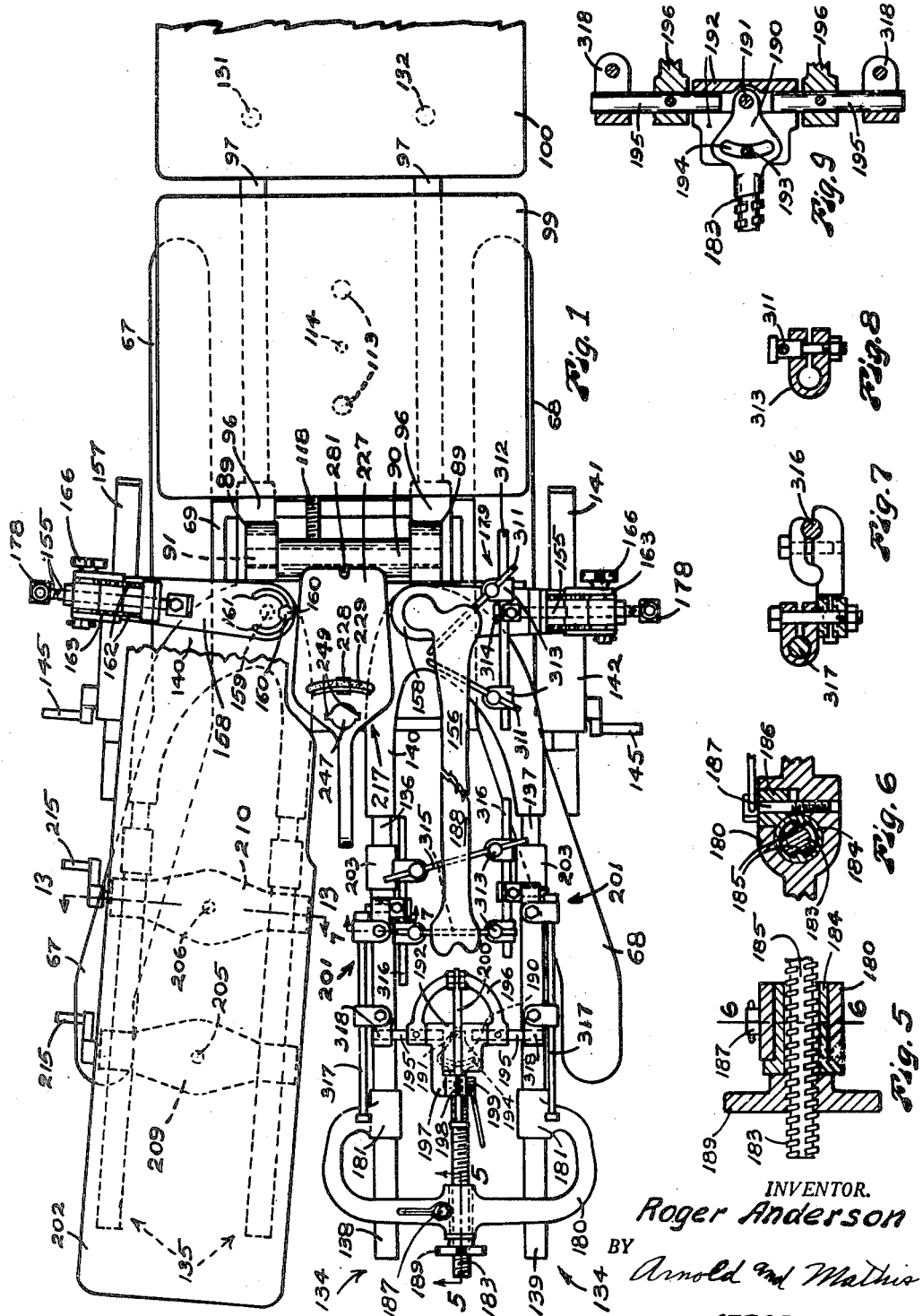
INVENTOR.
Roger Anderson
BY
Arnold and Mathis
ATTORNEYS

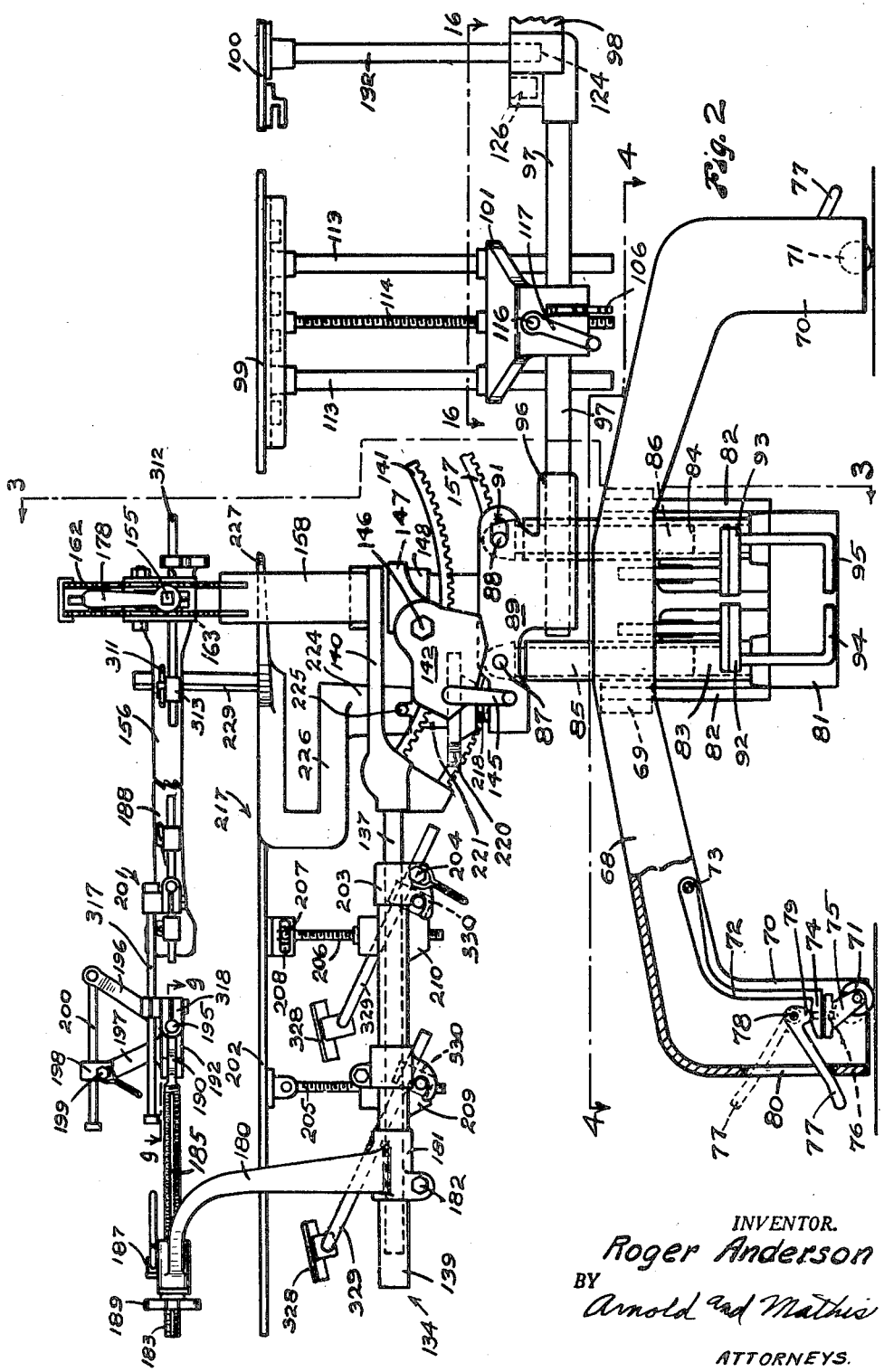

Aug. 2, 1949.   R. ANDERSON   2,477,562
ORTHOPEDIC TABLE AND FRACTURE REDUCING APPARATUS
Filed Oct. 17, 1945   14 Sheets-Sheet 3
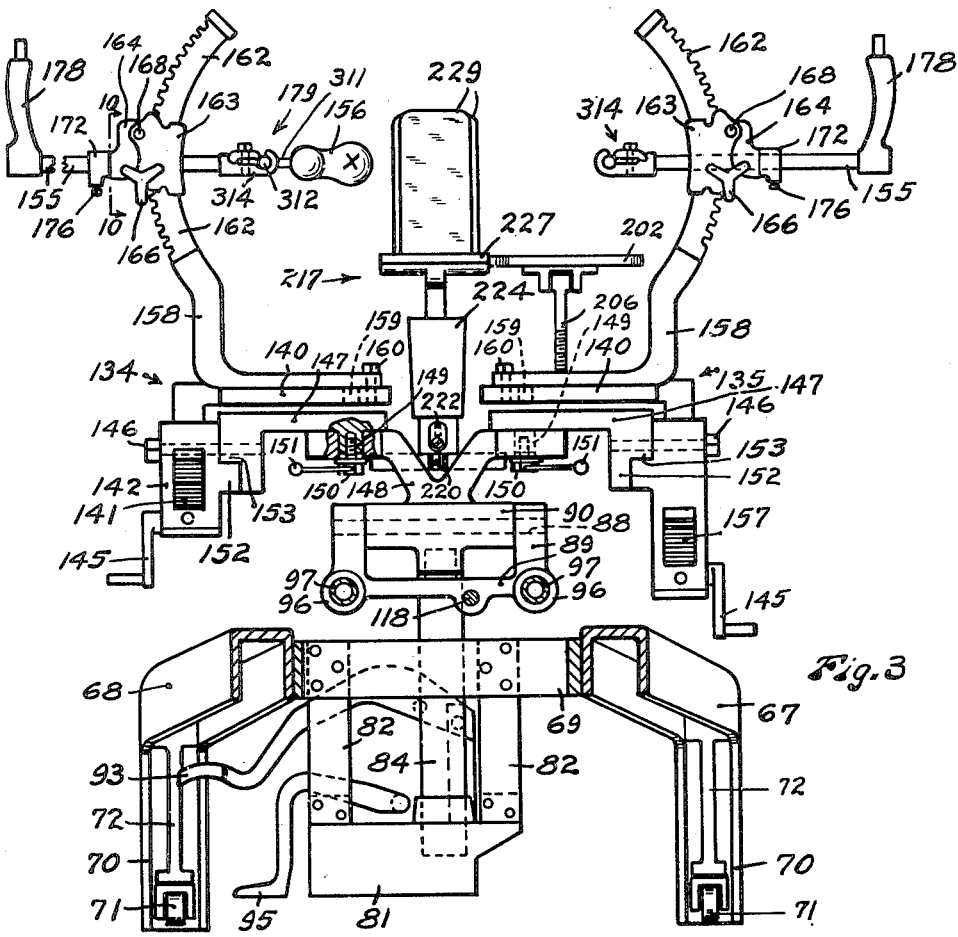
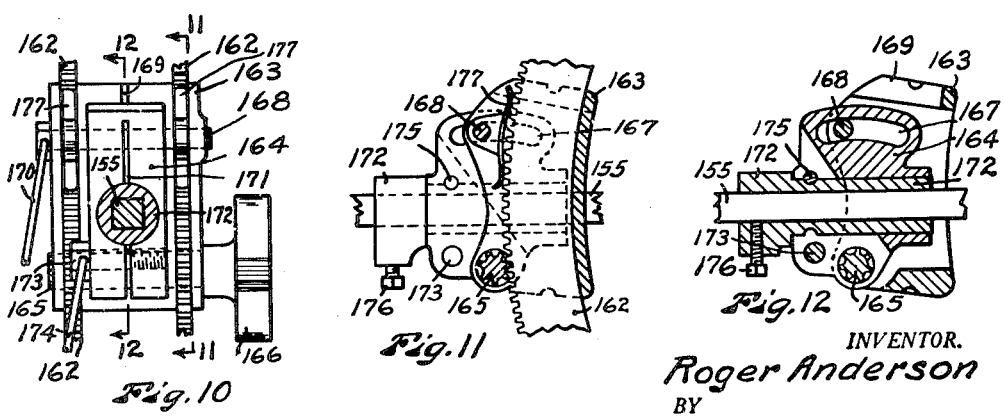
INVENTOR.
Roger Anderson
BY
Arnold and Mathis
ATTORNEYS

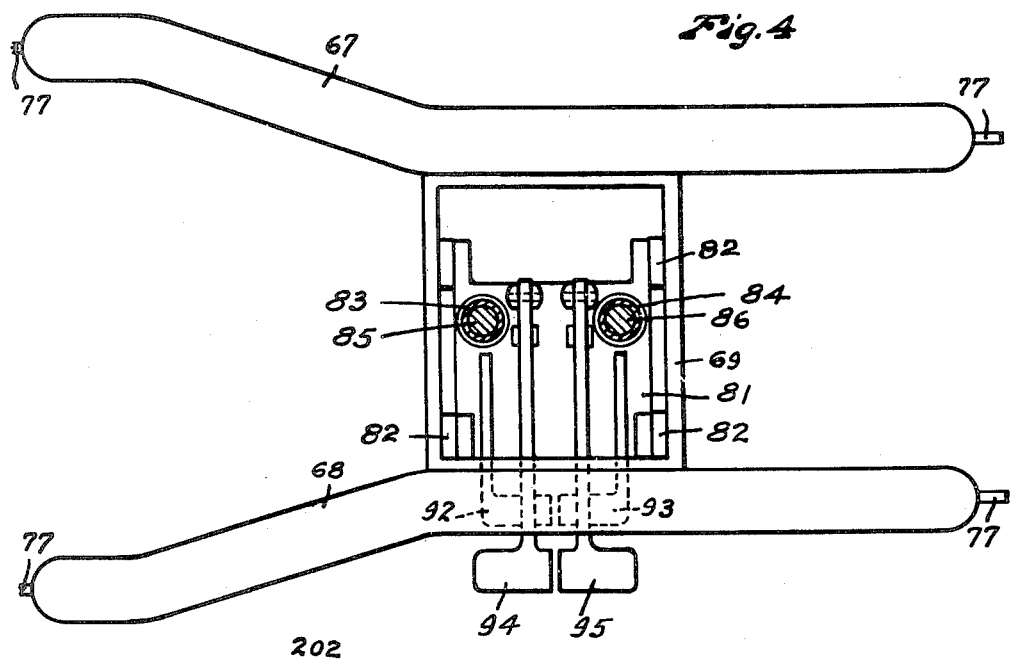
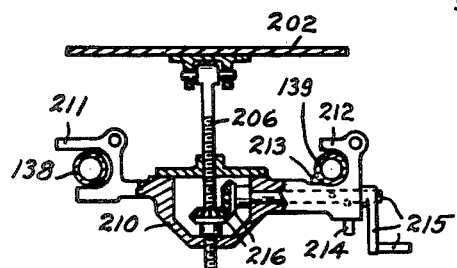
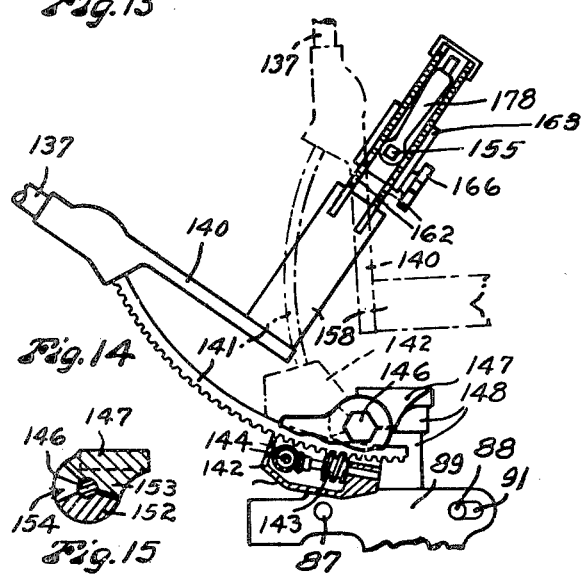

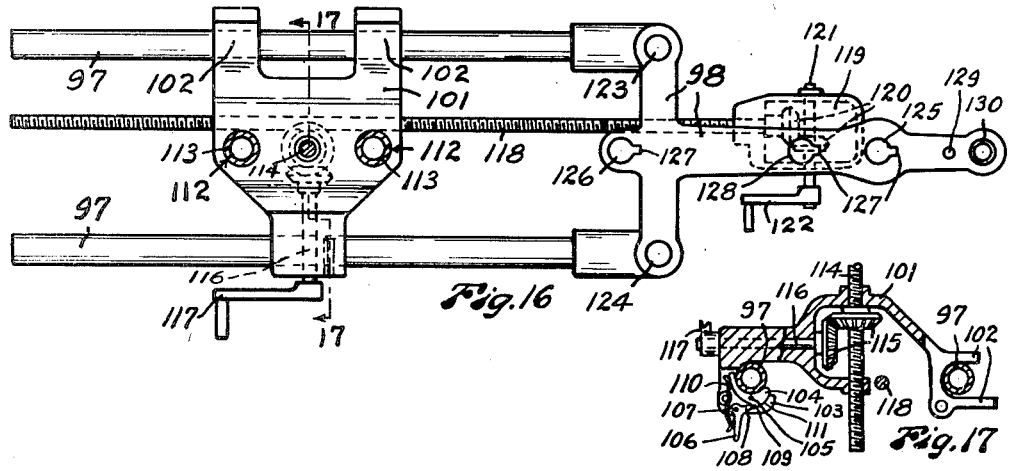

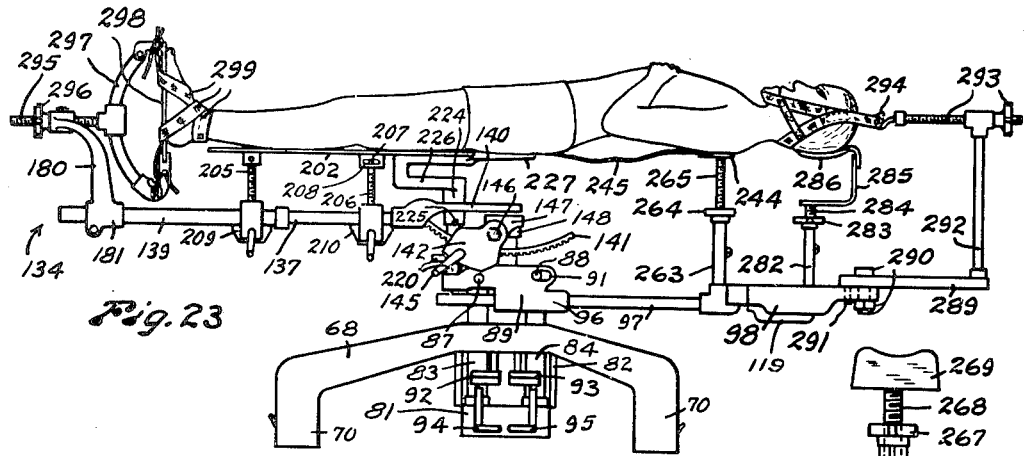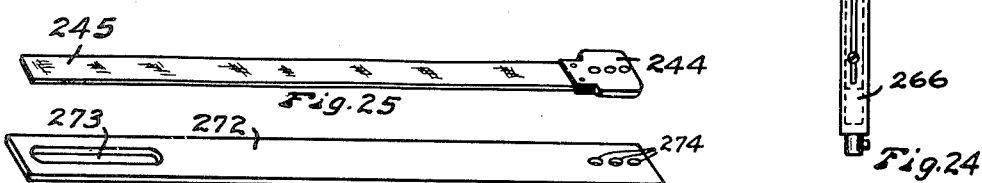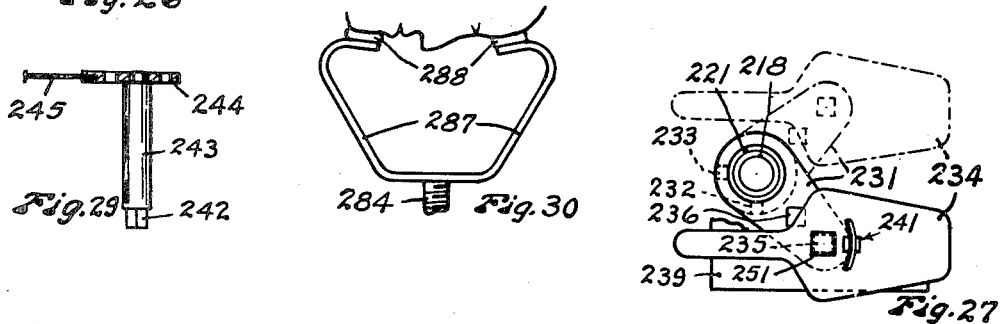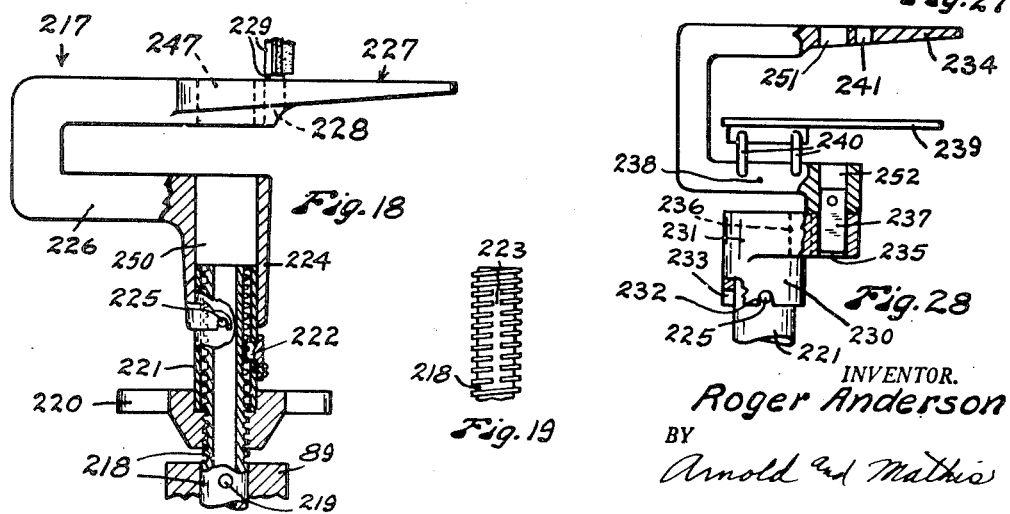

Aug. 2, 1949.  R. ANDERSON  2,477,562
ORTHOPEDIC TABLE AND FRACTURE REDUCING APPARATUS
Filed Oct. 17, 1945  14 Sheets-Sheet 7
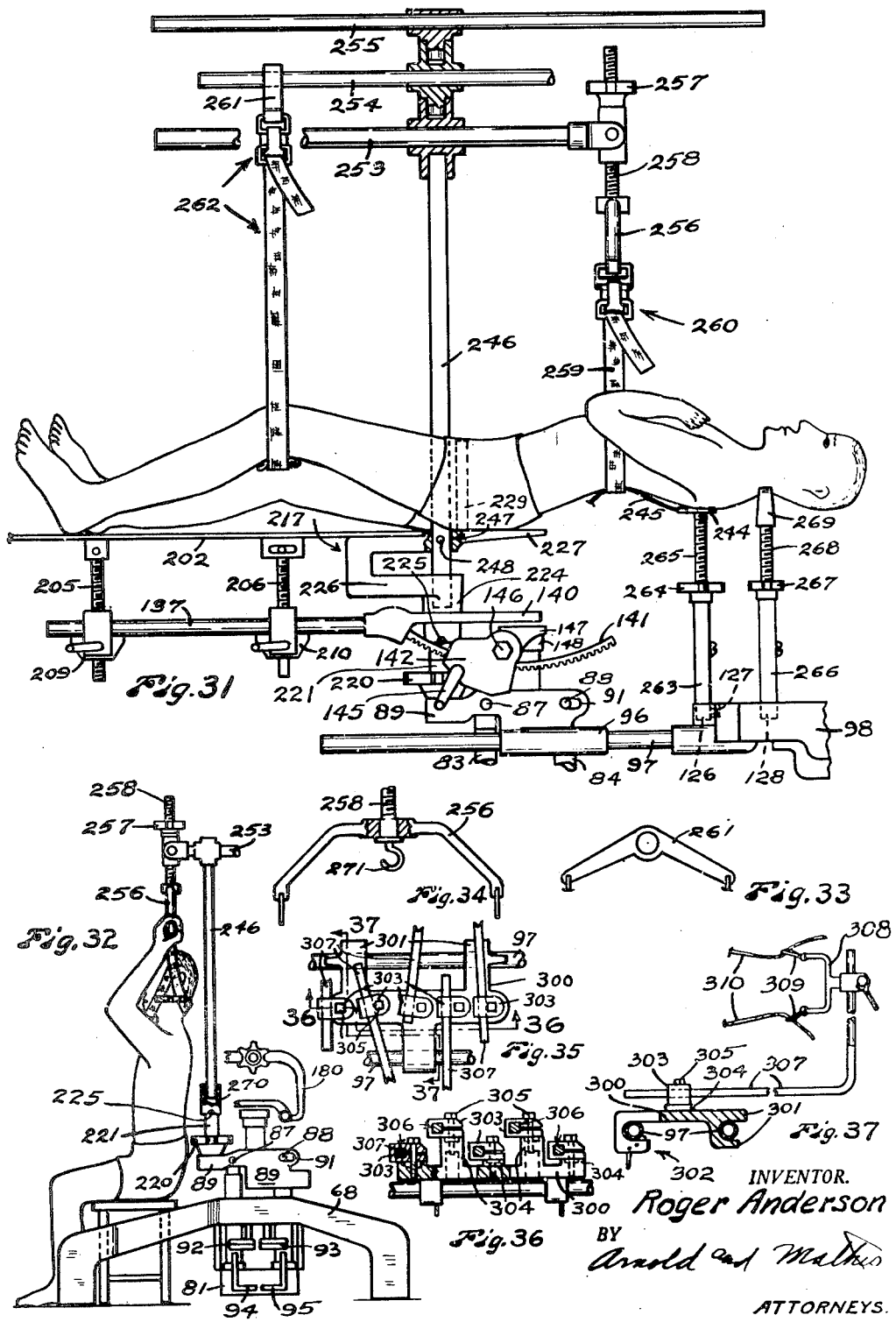
INVENTOR.
Roger Anderson
BY
Arnold and Mathes
ATTORNEYS.

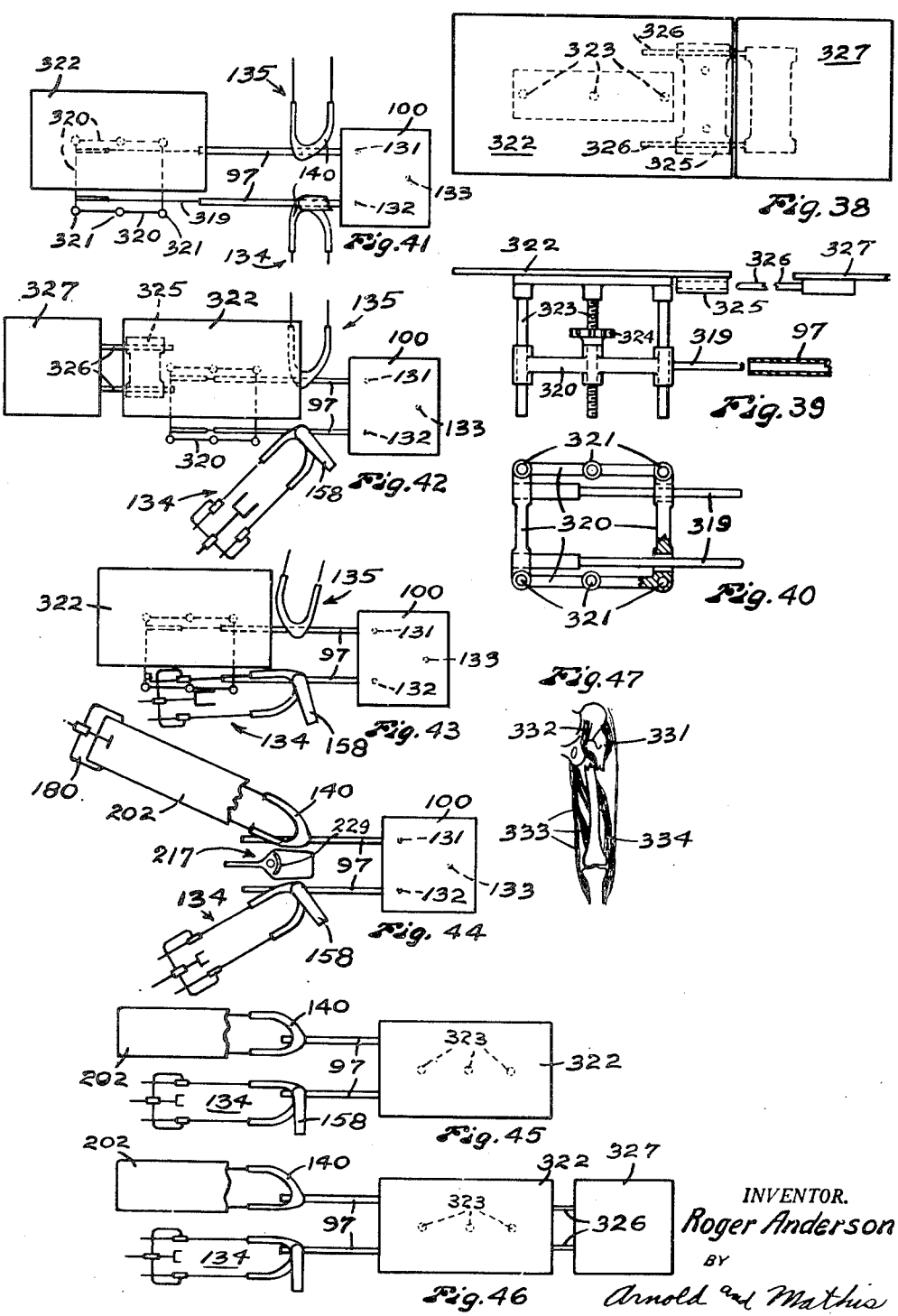

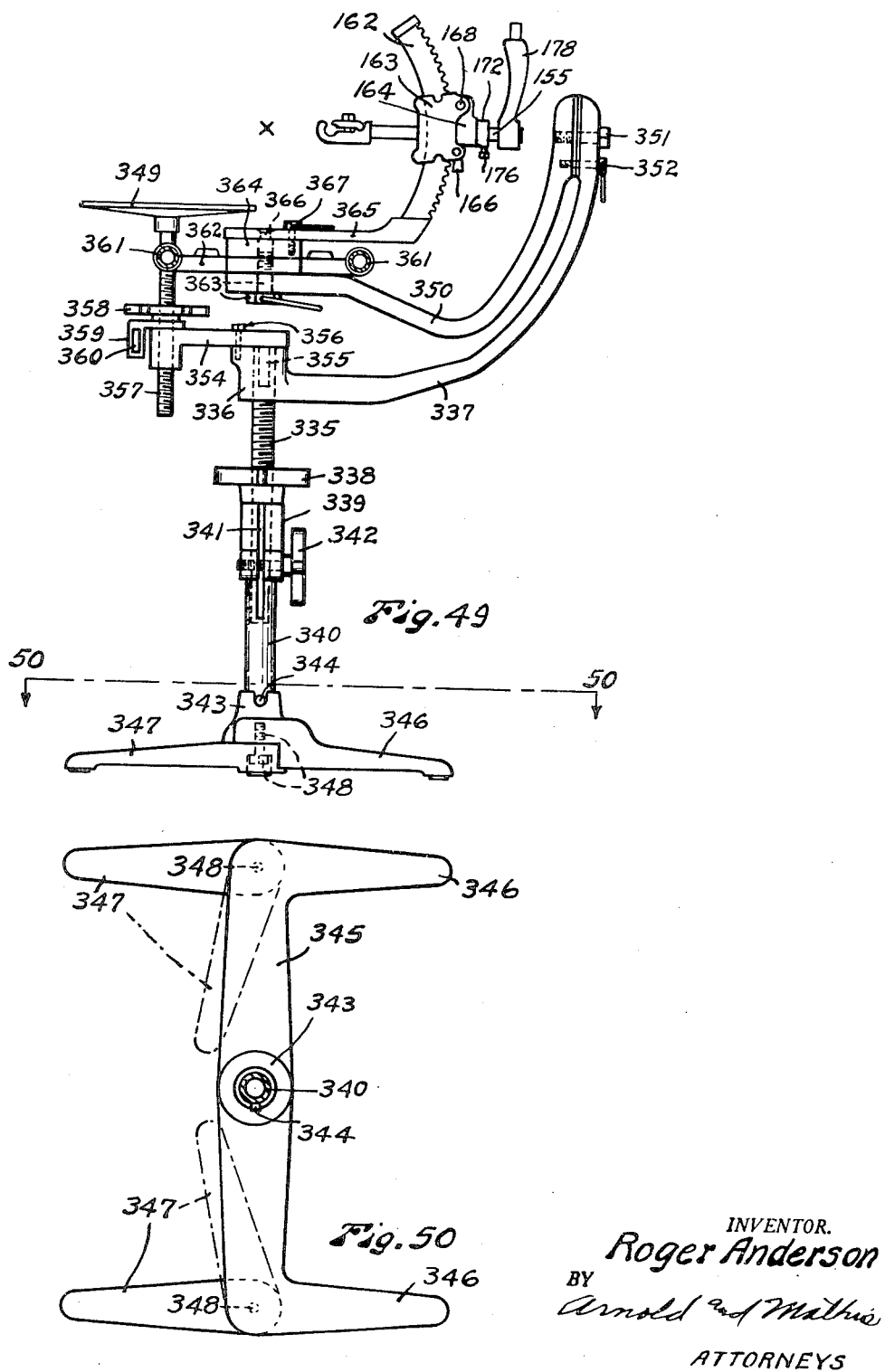

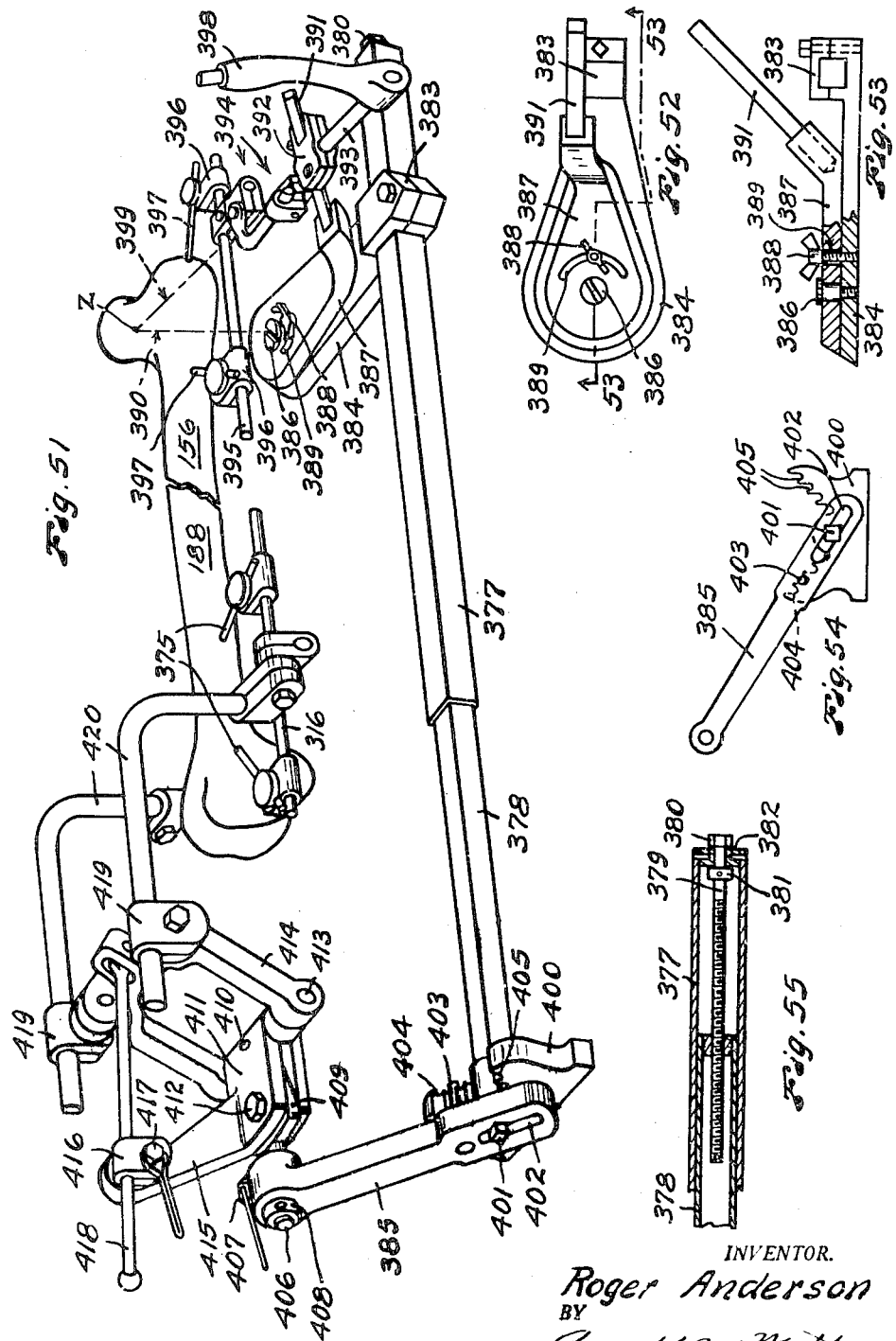

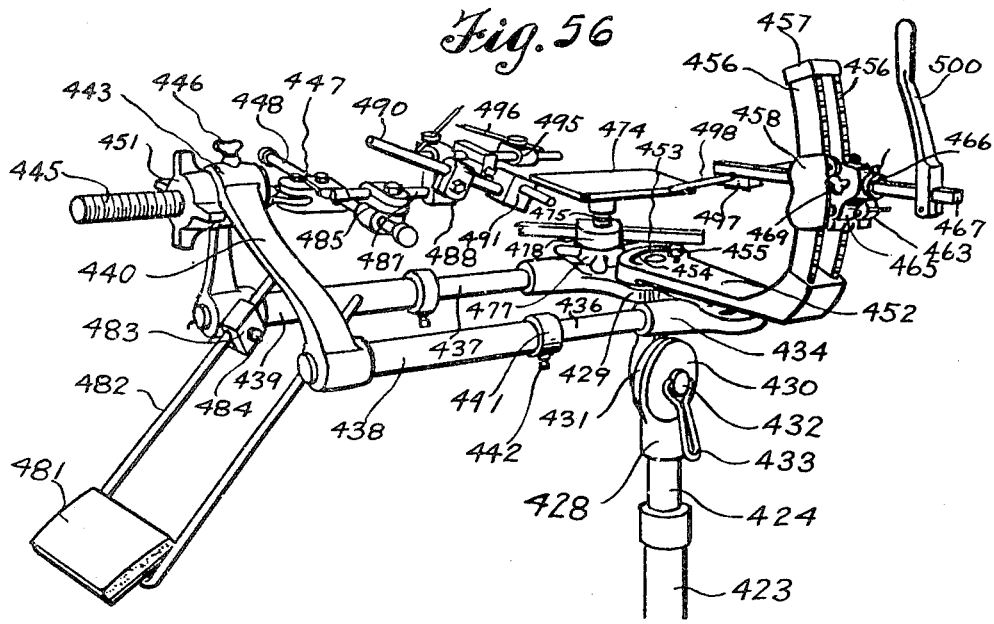
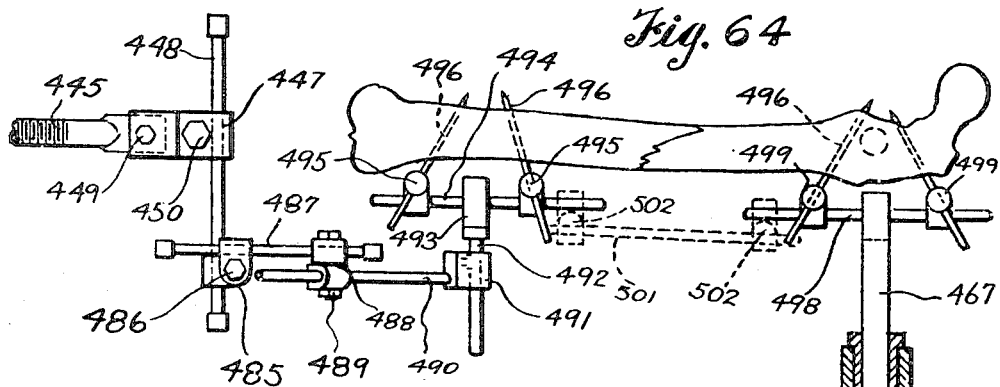
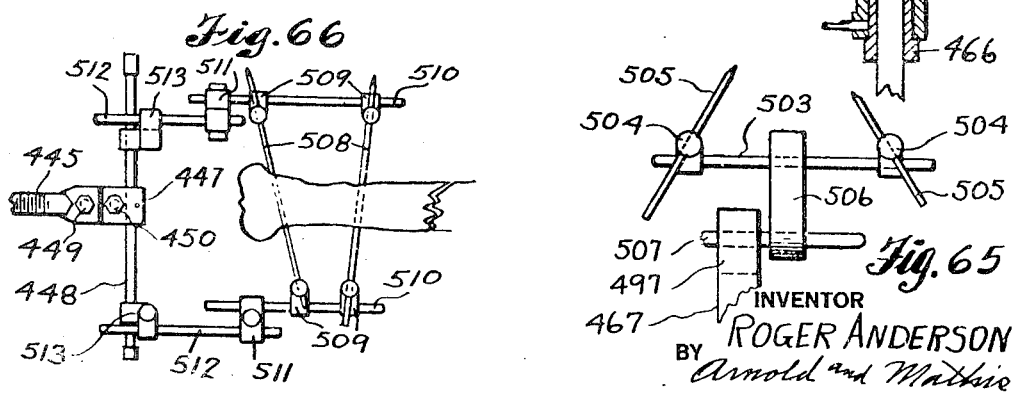

Aug. 2, 1949.   R. ANDERSON   2,477,562
ORTHOPEDIC TABLE AND FRACTURE REDUCING APPARATUS
Filed Oct. 17, 1945   14 Sheets-Sheet 13
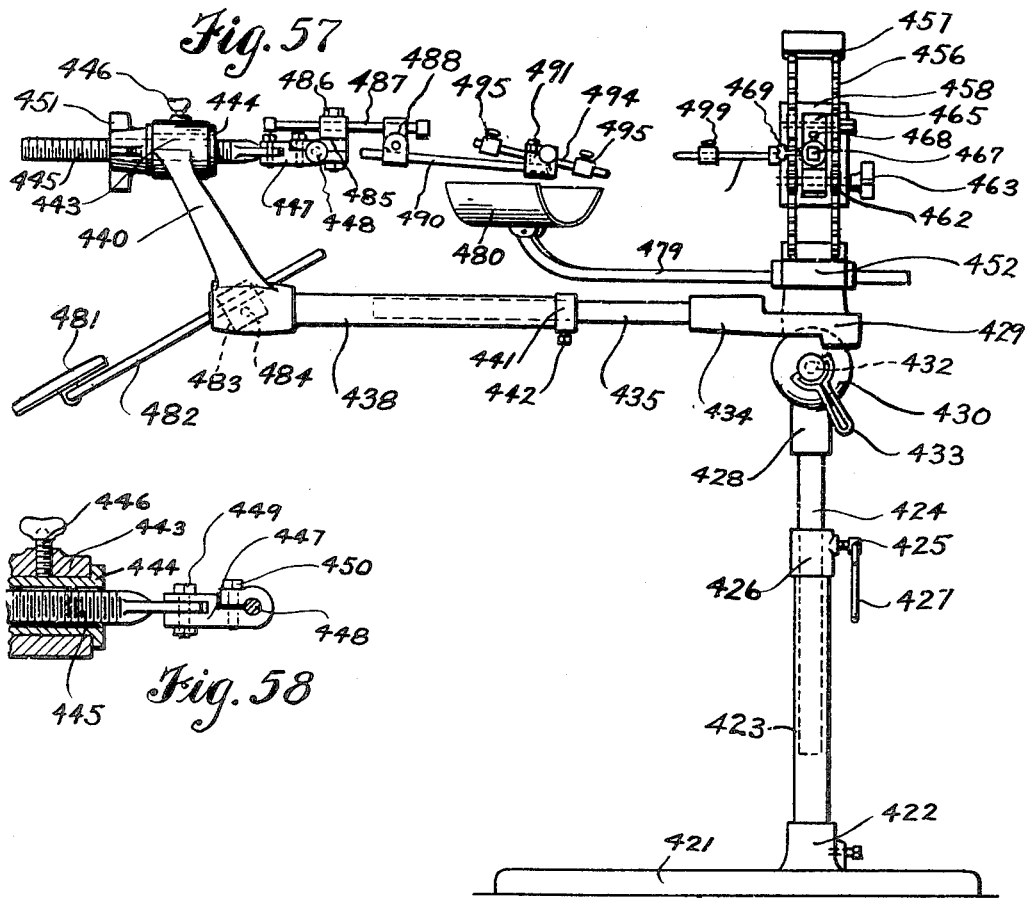
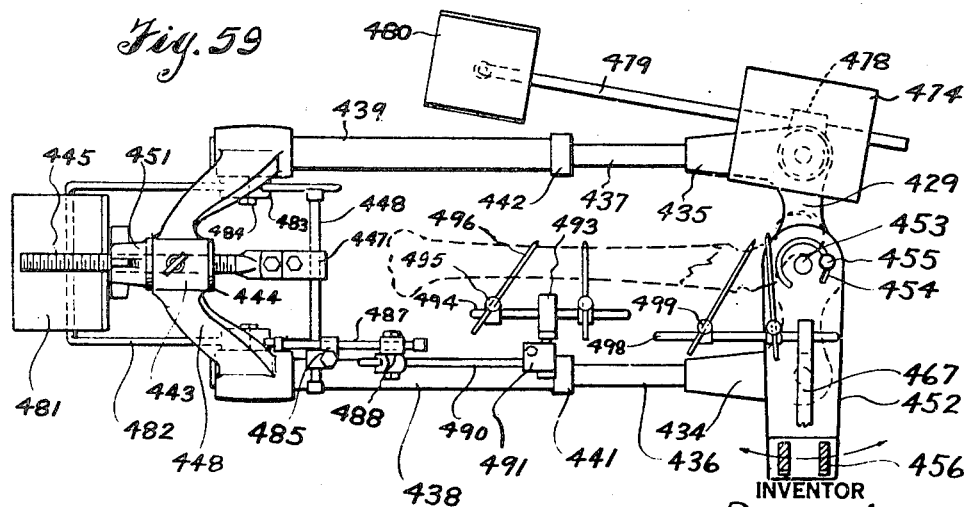
INVENTOR
ROGER ANDERSON
BY Arnold and Mathis
ATTORNEYS

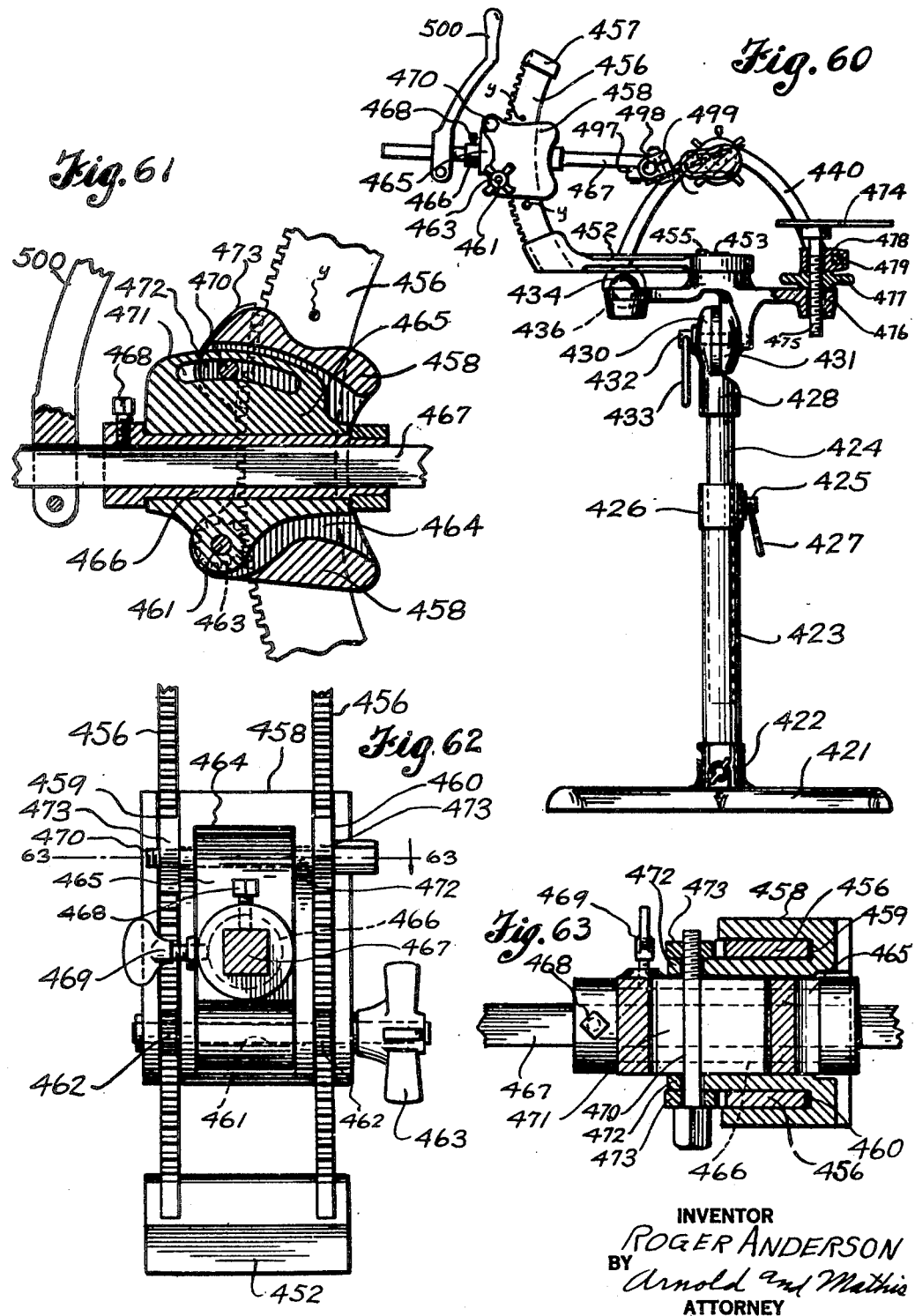

Patented Aug. 2, 1949

2,477,562

UNITED STATES PATENT OFFICE 2,477,562

ORTHOPEDIC TABLE AND FRACTURE REDUCING APPARATUS

Roger Anderson, Seattle, Wash.

Application October 17, 1945, Serial No. 622,786

14 Claims. (Cl. 128—84)

This invention relates to an orthopedic table, fracture reducing apparatus, and methods of reducing fractures.

A primary object of this invention is to provide a substantially centrally disposed supporting means and to extend two movable traction units in one direction and an extension frame in an opposite direction and which are designed to carry substantially all of the various orthopedic appliances which are needed in modern orthopedic surgery.

It is a further object of this invention to provide an orthopedic table or splint wherein five movements are provided which coincide with the center of articulation at the superior end of the limb involved. The five movements will comprise moving the limb supporting structure angularly in vertical and horizontal planes and moving transfixion means connected with the bone and the connected bone angularly in horizontal and vertical planes and rotatively.

It is a further object of the invention to provide any of the five movements mentioned in the preceding paragraph and where any of the same can obtain while traction is being applied between a distal and a superior fragment and at the same time without in any wise substantially changing the said applied traction.

It is a further object of the invention to provide the said five movements above mentioned and to provide means so that any or all of the same may be locked or freely movable.

It is a further object of the invention to provide traction means which may be connected with a distal fragment and to provide for movement of the distal fragment either angularly laterally, angularly vertically, or rotationally and with all movements taking place about a common point and which common point may be aligned with the anatomical axis of the limb being treated.

It is a further object of the invention to provide the three movements mentioned in the preceding paragraph and to provide means so that one or more of said movements may be free or locked as desired.

It is a further object of the invention to provide means wherein the three movements of the distal fragment about a common point and the five movements of the superior fragment or the limb about the axis of articulation at the superior end of the bone may be separate or joint or in the combination desired even when tractive forces are applied to the distal fragment relative to the superior fragment.

It is a further object of my invention to provide an orthopedic table which can be used in operations on patients of varying ages and sizes.

It is an object of this invention to provide orthopedic structure which permits substantially free access of the doctor or X-ray machines to any portion of the patient's body without interference from extending or projecting portions of the structure.

It is a further object of the invention to provide an orthopedic structure wherein the head end of the patient will always be toward the head end of the table and wherein it is not necessary to reverse the patient on the table to perform specific orthopedic operations.

It is a further object of the invention to provide a relatively stationary support and a relatively longitudinally movable carriage so that back arching devices can be disposed between the same and the flexion or degree of bending of the spine supported thereby will depend upon the relative spacing between the fixed and relatively movable members. Also, it is an object to provide manually operable mechanical means for causing relative movement between the parts so that the degree of flexion or bending of a spine can be mechanically manipulated and manually controlled.

It is a further object of the invention to provide spine, shoulder, neck, and head rest means, all of which will permit a cast or bandage being wrapped thereabout and which various supports can be removed after the bandage or cast has been completed.

It is a further object of the invention to provide means to support various portions of a human body on an orthopedic table by means of adjustable and removable straps which are carried by the orthopedic table or accessories connected therewith and thus eliminate the necessity of the doctor providing individual bandages for individual support of a limb or member for each particular orthopedic operation.

It is a further object of the invention to provide devices carried by an orthopedic table so that lateral curvatures of the spine can be corrected thereby and at the same time extension of the spine can be applied jointly or separately therewith or therefrom and which means, to provide tension of the spine of a patient, are also carried by the orthopedic table.

It is a further object of the invention to provide various fracture reducing means and which fracture reducing means can overcome the various fragment displacing forces of muscles regardless of the level of the fracture, i. e., the location of a fracture in a particular bone.

It is a further object of the invention to provide structure and mode of operation so that the soft tissues comprising muscles, fascia, blood vessels, and skin can be utilized in the reduction of a fracture at various levels rather than functioning as means to resist reduction of a fracture.

It is a further object of the invention to provide various carriages to support various portions of a patient's body and which carriages are self-locking so that if the carriages are in place, the doctor will be certain that they are locked and thus is prevented a break in technique which might happen if someone forgot to tighten the securing means of a carriage.

It is a further object of the invention to provide orthopedic structure having means providing for manipulation of bone fragments or bones, whether the patient be an infant, child, or adult, about the anatomical axis and the anatomical center of articulation thereof.

It is a further object of the invention to provide structure to receive transfixions for long bones of a patient, whether an infant, child, or adult, and to provide means for manipulation of the limb as well as the bone fragment about the anatomical axis at the superior end of the bone or the bone fragment.

Another object of the invention is to provide an orthopedic table which can be tilted, i. e., the head raised or lowered relative to the foot of the table, and operated in response to control means which can be manipulated by a lower extremity of a doctor. In this connection it is to be remembered that the hands of a doctor must be sterile during an operation and for such reason doctors heretofore needed the aid of an assistant in tilting orthopedic tables. Often tilting of a table is employed as means to adjust tractive forces and thus it is highly desirable that the doctor be able to manipulate the tilting means and to the extent he may desire in changing tractive forces. This has not been heretofore obtainable as all of the various mechanical means employed in tilting tables were hand operated and obviously the doctor could not wisely operate the same as such may cause his hands to be unsterile.

As the technique employed in a particular orthopedic operation will vary with the individual case and with the individual doctor, I have not attempted to set forth all of the objects of my invention except in a general way and the objects of the invention and the results obtained will in a large measure depend upon the particular manipulation of the structure shown and described. Thus the above mentioned general objects of my invention together with others inherent in the same are attained by the devices illustrated in the following drawings, the same being preferred exemplary forms of embodiment of my invention and throughout which drawings like reference numerals indicate like parts:

Figure 1 is a plan view of a fracture table embodying this invention, with parts broken away, and showing for purposes of illustration a broken femur in an operative position in the machine;

Fig. 2 is a view in side elevation of the apparatus and parts shown in Fig. 1 and a portion of the base is broken away to illustrate parts therein;

Fig. 3 is a view partly in section and partly in elevation taken substantially on broken line 3—3 of Fig. 2;

Fig. 4 is a view partially in plan and partially in section taken substantially on broken line 4—4 of Fig. 2;

Fig. 5 is a sectional view taken substantially on broken line 5—5 of Fig. 1;

Fig. 6 is a sectional view taken substantially on broken line 6—6 of Fig. 5;

Fig. 7 is a view partially in section and partially in elevation taken substantially on broken line 7—7 of Fig. 1;

Fig. 8 is a detached view partially in section and partially in elevation of one of the clamping means which may be employed in this invention to secure a half pin, full pin, or wire to a fixation rod;

Fig. 9 is a view on a somewhat larger scale and is partially in plan and partially in section and is taken substantially on broken line 9—9 of Fig. 2;

Fig. 10 is a view in section with parts shown in elevation, taken substantially on broken line 10—10 of Fig. 3 and on a larger scale than the parts of Fig. 3;

Fig. 11 is a view partially in section and partially in elevation and with parts shown by dotted lines and is taken substantially on broken line 11—11 of Fig. 10;

Fig. 12 is a sectional view with parts shown in elevation and taken substantially on broken line 12—12 of Fig. 10;

Fig. 13 is a sectional view with parts shown in elevation and taken substantially on broken line 13—13 of Fig. 1;

Fig. 14 is a detached view with parts broken away, with parts shown in section and parts shown in elevation of one of the traction frames and mounting means therefor;

Fig. 15 is a view in section of a detail of the mounting means shown in the preceding figure;

Fig. 16 is a detached view in plan of the extension frame shown in Figs. 1 and 2, the parts being shown as they would appear if they were taken on broken line 16—16 of Fig. 2;

Fig. 17 is a sectional view with parts shown in elevation and taken substantially on broken line 17—17 of Fig. 16;

Fig. 18 is a detached view, parts being shown in section and parts being shown in elevation, of the sacral rest and a fragment of the mounting means therefor, such parts also being shown in Figs. 1, 2 and 3;

Fig. 19 is a detached view in elevation showing a portion of a screw member employed in Fig. 18;

Figure 48:
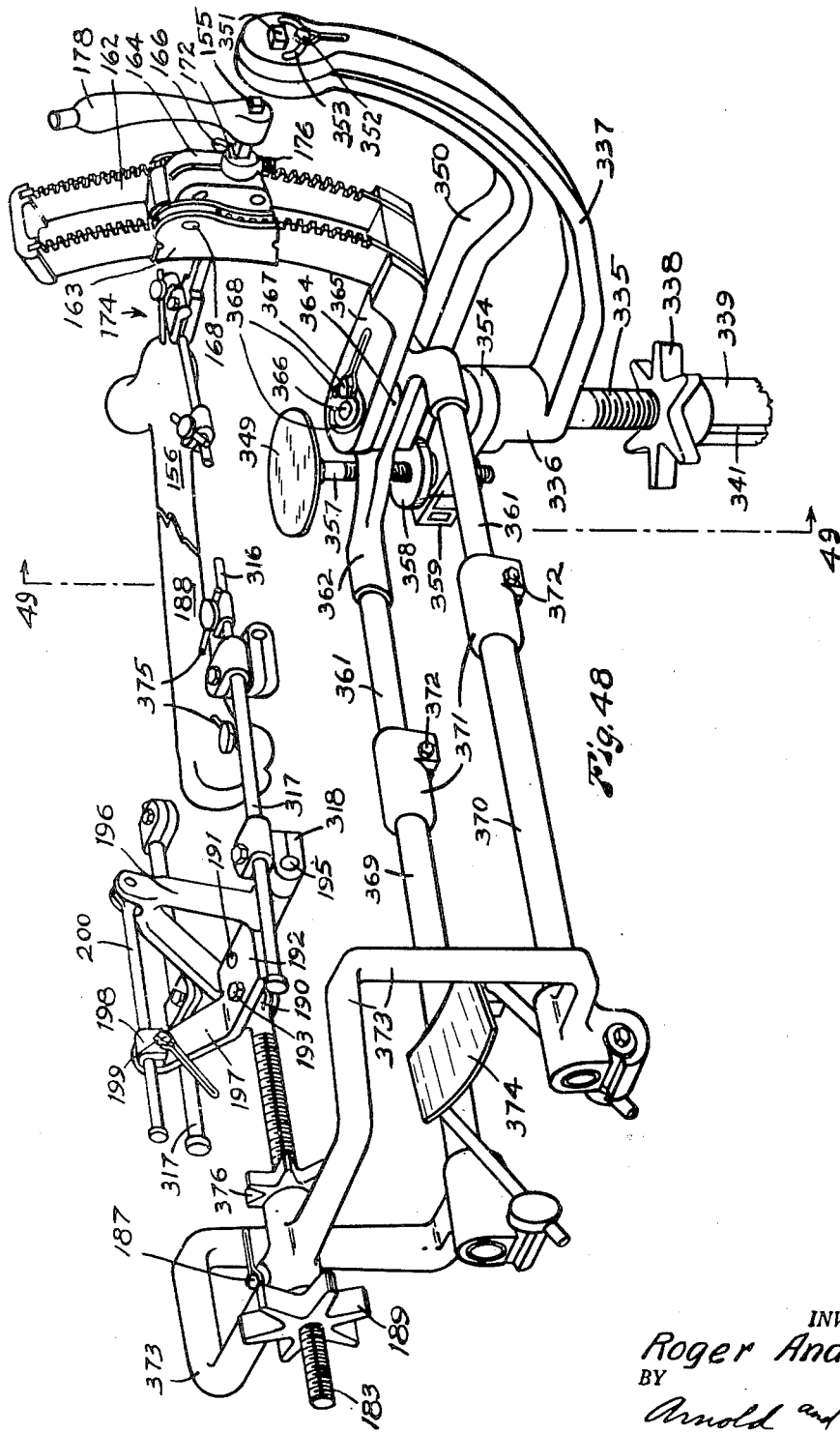

Fig. 20 is a fragmentary view in elevation of the right hand portion of the device shown in Fig. 2 of the drawings, except that the lumbar support shown in Fig. 2 has been removed and a flexible back arching and supporting device is shown in place between the sacral rest and the head table next only, a fragment of the head table is shown in Fig. 2 while the complete head table is shown in Fig. 20, and next, a patient is diagrammatically illustrated on the structure shown in Fig. 20;

Fig. 21 is a fragmentary view in plan of the back supporting and arching device shown in Fig. 20;

Fig. 22 is a sectional view, with the central portion broken away, taken substantially on broken line 22—22 of Fig. 21;

Fig. 23 is a view in side elevation of the device shown in Fig. 2 of the drawings and the following accessories have been taken off or removed: the lumbar support, the head table, the countertraction units, the traction unit shown to the left of Figs. 1 and 2, and the leg or calf support— and the following accessories or parts have been put in position: the sling means and supporting frame, the head rest, the shoulder support, leg supports for a patient, and traction means connecting with the feet of a patient;

Fig. 24 is a detached view in elevation of a neck rest embodied in this invention;

Fig. 25 is a detached perspective view of a shoulder rest and retrieving strap connected therewith employed in this invention;

Fig. 26 is a detached perspective view of a spine support employed in this invention;

Fig. 27 is a detached plan view of a child's sacral rest used in connection with my fracture table, showing one operative position of said sacral rest by full lines and another operative position of the same by dot and dash lines;

Fig. 28 is a side elevation of the sacral rest shown in Fig. 27, parts being shown in section to better illustrate certain structural features;

Fig. 29 is a detached view partly in elevation and partly in section showing a shoulder rest that is adapted to be used in connection with the sacral rest support shown in Figs. 27 and 28;

Fig. 30 is a detached view in side elevation of a head rest adapted to be used by a patient who is placed face down on this fracture table;

Fig. 31 is a view in side elevation, with parts broken away, of this fracture table, illustrating the use of a leg board, a sacral rest, a shoulder support, a neck rest or support, and certain overhead supports carrying slings by which parts of a patient are supported in desired positions;

Fig. 32 is a side elevation of this fracture table with parts removed and parts broken away, showing overhead supporting means and sling means used for exerting tension on the spine of a patient;

Fig. 33 is a detached elevation of a sling spreader used in the structure shown in Fig. 31;

Fig. 34 is a detached elevation, with parts in section, of another sling spreader used in the structure shown in Figs. 31 and 32;

Fig. 35 is a plan view, with parts broken away, of devices used in connection with an extension frame of this fracture table for exerting opposing lateral tractions on portions of the body of a patient that is supported on the table;

Fig. 36 is a view partly in section and partly in elevation taken substantially on broken line 36—36 of Fig. 35;

Fig. 37 is a view partly in section and partly in elevation taken substantially on broken line 37—37 of Fig. 35 and showing additional parts of L-shaped arms by which lateral tractions are exerted;

Fig. 38 is a plan view of a transfixion table and transfixion table extension constructed in accordance with this invention and constituting a part of this fracture table;

Fig. 39 is a side view of said transfixion table showing the transfixion table extension withdrawn from the transfixion table and partially broken away and showing transfixion table supporting devices;

Fig. 40 is a detached plan view of a transfixion table supporting device, parts being shown in section;

Fig. 41 is a diagrammatic plan view illustrating how the transfixion table shown in Figs. 38, 39 and 40 is used on this fracture table to facilitate the application of a spica or a body cast to a patient;

Fig. 42 is a diagrammatic plan view showing how said transfixion table and transfixion table extension are used as a part of this fracture table to facilitate the application of a cast on the upper arm of a patient;

Fig. 43 is a diagrammatic plan view showing how said transfixion table is used as a part of this fracture table to facilitate application of a cast to the forearm of a patient;

Fig. 44 is a diagrammatic plan view showing how this fracture table can be used without the transfixion table in the instance of a thigh transfixion or hip operation;

Fig. 45 is a diagrammatic plan view showing how said transfixion table can be used as a part of this fracture table to facilitate the operations on the lower leg of a patient;

Fig. 46 is a diagrammatic plan view showing how said transfixion table and transfixion table extension can be used to facilitate an ankle operation;

Fig 47 is a diagrammatic view illustrating how the muscles are attached to the upper femur in such a manner that they tend to hold the upper fragment of a broken femur in a disaligned position relative to the lower fragment thereof when the femur is broken near the hip joint;

Fig. 48 is a perspective view, with parts broken away, of a splint constructed in accordance with this invention showing a fractured femur in said splint to illustrate one manner of application of this splint to a femur;

Fig. 49 is a view taken substantially on broken line 49—49 of Fig. 48, the femur being omitted and parts of the base structure that are broken away in Fig. 48 being shown;

Fig. 50 is a plan view of the folding base of this splint looking in the direction of broken line 50—50 of Fig. 49—the folded positions of leg members being shown by dot and dash lines;

Fig. 51 is a perspective view of a bedside splint constructed in accordance with this invention;

Fig. 52 is a detached plan view of an adjustable bracket member used in the splint shown in Fig. 51;

Fig. 53 is a side view of said bracket member, with parts in section taken substantially on broken line 53—53 of Fig. 52;

Fig. 54 is an end view of another bracket member used in Fig. 51;

Fig. 55 is a fragmentary sectional view of adjustable traction means employed in Fig. 51;

Fig. 56 is a perspective view of modified form of a splint embodying this invention;

Fig. 57 is a side view of the structure of Fig. 56;

Fig. 58 is a view partly in section and partly in elevation of a part of the traction unit illustrated in Fig. 56;

Fig. 59 is a top plan view of the splint of Fig. 56 illustrating one way of mounting the transfixion pins as used with the traction applying member—the means for mounting transfixions of the countertraction means being broken away for better illustration of the mounting arm;

Fig. 60 is an end view of the splint of Fig. 56, showing the countertraction means and the parts thereof for effecting rotational correction and angulation of the superior fragment;

Fig. 61 is an enlarged, cross sectional detail of the movable mounting block for the countertraction rod of the splint of Fig. 56;

Fig. 62 is an outer end view of the parts shown in Fig. 61;

Fig. 63 is a sectional view with parts in plan taken substantially on broken line 63—63 of Fig. 62;

Fig. 64 is a plan view showing the application of transfixion pins and parts of previous figures to the fragments of a fractured femur, and showing a preferred arrangement of rods and pin holding clamps as used with the traction and countertraction devices;

Fig. 65 shows an alternative type of mounting for pins of a countertraction device; and Fig. 66 is an alternative arrangement of parts as used with a traction device for through transfixion pins.

The base or supporting structure for the fracture table herein disclosed comprises two leg members 67 and 68, Figs. 1 to 4, that are rigidly secured to an open frame member 69 of rectangular shape. The two leg members are of substantial length and are spaced apart by the frame 69 and have downturned end portions 70 which cooperate to provide four point supporting means. The leg members 67 and 68 diverge at the end of the machine shown at the left in Figs. 1, 2 and 4 to provide greater transverse stability against tipping and to provide more room at this end of the machine for X-ray equipment and/or an operator therebetween.

In order to provide for mobility of the fracture table and stability, preferably I employ retractile casters. The preferred form of retractile casters is that shown in the drawings where the operating levers move the casters into supporting positions and when the casters are retracted then the table legs rest directly on the floor. This structure comprises a caster wheel or roller 71 adjustably mounted in each downwardly extending leg portion 70. Also preferably each caster wheel 71 is adjustable between a load carrying position and a retracted position in which it does not carry any load but allows the down turned portions 70 of the leg members to rest directly on a support such as a floor. An apparatus for adjustably mounting a caster wheel 71 is shown at the left in Fig. 2. This apparatus comprises an L-shaped bracket arm 72 mounted on a pivot 73 and provided with a foot member 74. The caster wheel 71 is rotatively mounted in a forked member 75 that is connected as by a pivot member 76 with the foot member 74. A lever 77 is mounted for oscillation on a pivot 78 and has a cam portion 79 positioned to engage with and press against the top side of the foot member 74. An end portion of the lever 77 extends out through a slot 80 in the down turned portion 70 of each leg member for convenience of operation. When the lever 77 is moved downwardly into the position shown by full lines in Fig. 2 the caster wheel will protrude below the bottom of a leg member portion 70 and will cooperate in supporting the fracture table for movement on the casters. When the lever 77 is in the broken line position, the bottom end portion of a leg member portion 70 will rest on the floor and the fracture table will be supported with more stability.

Preferably the upper structure of the fracture table is vertically movable and tiltably adjustable relative to the base structure just described. I may employ screw means, manually or electrically operated, lever means or hydraulic means to accomplish this purpose. The primary element of such means resides in the foot or leg control. A doctor must keep his hands sterile but such is not applicable to his feet or legs. Thus I desire to provide means which the doctor can manipulate and by his lower extremities. Thus, the doctor can directly control the position of the table.

As an illustration of such means, I have shown a rectangular box-like base 81 positioned below the frame 69 and supported from said frame 69 by supporting bars 82. Two hydraulic cylinders 83 and 84 are secured to the base 81 and extend upwardly therefrom. Two pistons 85 and 86 are provided in the respective cylinders 83 and 84. The upper end portions of the pistons 85 and 86 are respectively connected by pivot members 87 and 88 with a mounting block 89. Preferably the connection between the upper end portion of the piston 86 and the mounting block 89 includes a T-shaped member 90, as more clearly shown in Fig. 3. Also the pivot member 88 preferably is received within longitudinal slots 91 in the mounting block 89 to provide for tilting movement of the mounting block, as hereinafter explained.

Suitable hydraulic operating and control means are provided for raising or lowering either of the hydraulic pistons 85 and 86 independently or for simultaneously raising or lowering both of said pistons. The hydraulic means per se may be of any approved type. Preferably this hydraulic means is operated by four pedals 92, 93, 94, and 95 which are responsive to the lower extremities, as the feet. The pedal 92 controls upward movement of piston 85, and pedal 93 controls upward movement of the piston 86, the pedal 94 controls downward movement of piston 85, and the pedal 95 controls downward movement of the piston 86. The two pedals 92 and 93, which control upward movement of the pistons 85 and 86, are positioned side by side in close proximity to each other, Figs. 2 and 4. This makes it possible to operate with one foot of an operator both of said pedals simultaneously or to operate either of said pedals independently of the other. Similarly, the two pedals 94 and 95 are positioned side by side in close proximity for simultaneous or independent operation by one foot of an operator. This arrangement of control pedals makes it possible to raise or lower the mounting block without changing its inclination or tilt relative to the horizontal or to change the inclination of said block by raising or lowering either end of the same.

The mounting block 89 carries various means to support a patient as will hereinafter appear and changing the inclination of the block 89 by raising or lowering either end raises or lowers the head of a patient from a horizontal position. While many treatments employ the relative raising or lowering of the head of a patient as respects his feet, one functionally related treatment is where the feet of a patient have been secured and the weight of a patient functions to provide the traction force. Thus by tilting the position of a patient his weight may be distributed toward or away from the feet and thus the doctor can operate means controllable by his lower extremities and still have his hands remain sterile.

The mounting block 89 carries the upper structure of this fracture table as will be hereinafter described. To facilitate this, the mounting block is provided below the pivots 87 and 88, with two transversely spaced apart tubular horizontal socket members 96 that are adapted to telescopically receive and support two parallel extension frame tubes 97. The outer ends of the tubes 97 are secured to a bracket member 98 of a form more fully shown in Figs. 16 and 20. The extension frame provided by tubes 97 and brackets 98 is adapted to support a plurality of different devices that contribute to the utility of this fracture table.

Figs. 1 and 2 show a lumbar support 99 and a head rest 100 supported on the extension frame 97—98. The lumbar support 99 is supported by a carriage 101 that is mounted on the tubes 97 and is movable longitudinally thereof, see also Figs. 16 and 17. The primary character of the carriage is that if the carriage is in place on tubes 97, it will inherently be locked thereon. If screw means were necessary to lock the carriage in place, then the locking might be overlooked and an operation fail because of a carriage and a supported patient falling. A means for such purpose comprises: two U-shaped bracket portions 102 that fit over one of the tubes 97 and a hook-shaped bracket 103 that fits over the other tube 97. A latch member 104 mounted on a pivot 105, in bracket 103, Fig. 17, prevents transverse displacement of the carriage 101 on the tubes 97. A hand operated lever 106, mounted on a pivot member 107, has an arm 108 that engages with a shoulder 109 of the latch member 104 to hold the latch member 104 in locking position. A spring 110 yieldingly engages both the latch member 104 and the lever 106. This spring 110 yieldingly holds the lever 106 in a locked position relative to the latch member 104 when these parts are in the position shown in Fig. 17. When the lever 106 is manually moved clockwise, Fig. 17, enough to release the shoulder 109 of latch member 104, the pressure of the spring 110 will move the latch member 104 clockwise and the arm 108 of the lever will rest upon the curved surface 111 of the latch member 104. As the latch member 104 moves clockwise, Fig. 17, the tube 97 will be released and the carriage 101 can be moved to the left, Fig. 17, clear of both tubes 97. After the latch member 104 has been moved into an open or released position, it will be held in this open position by the spring 110 until the carriage 101 is again put back on the tubes 97.

As the carriage is replaced on the tubes 97 pressure of the tube 97 shown at left in Fig. 17, against the latch member 104 will return said latch member to a locked position with arm 108 of locking lever 106 in locked engagement with shoulder 109. The carriage 101 can thus be quickly and easily removed from the extension frame tubes 97 by release of locking lever 106. Also the latch member 104 will normally remain in an open position while the carriage is off of the extension frame, in which position said latch member will not interfere when the carriage is again put back on the tubes. Also said latch member will automatically move to a closed and locked position when the carriage 101 is put back in its proper position on the extension frame members 97.

The carriage 101 has two spaced apart vertical openings 112 (Fig. 16) for slidably receiving two leg members 113 that are rigidly secured to the lumbar support 99 (Figs. 1 and 2).

The lumbar support 99 is supported and vertically adjusted by a screw 114, which is secured to said lumbar support 99 and extends downwardly through the carriage 101. Within the carriage 101 the screw 114 is connected by bevel gears 115 with a horizontal shaft 116 that has a crank 117 on its outer end. The details of parts 114 to 117 are best shown in Fig. 17. As the leg members 113 are slidably mounted as respects the carriage 101, the screw 114 supports and vertically adjusts the lumbar support 99. Obviously angular movement of the crank 117 in opposite directions will cause vertical movement of the lumbar supports 99 in opposite directions.

For the purpose of longitudinally adjusting the extension frame, comprising tubes 97 and bracket member 98, a screw 118 is provided. The screw 118 is shown in plan in Fig. 16 and in cross section in Fig. 3 and Fig. 17. One end portion of the screw 118 is threaded into mounting block 89, Fig. 3. The other end portion of the screw 118 extends into a gear box 119 (Fig. 16) on the bracket member 98. Within the gear box 119 the screw 118 is connected by bevel gears 120 with a transverse shaft 121 that has a crank 122 on one end thereof for manual operation. Turning of crank 122 will rotate screw 118 in either desired direction thereby adjusting extension frame tubes 97 and bracket 98 longitudinally of the fracture table to any desired position relative block 89 and parts carried thereby. Screw 118 is not operatively connected with carriage 101 (see Fig. 17) but carriage 101 is supported on tubes 97 and moves longitudinally of the fracture table with said tubes 97. Carriage 101 can be manually adjusted along tubes 97 independently of any movement of extension tubes 97 provided by reason of operation of screw 118. The purpose of screw 118 is to provide relative longitudinal adjustment of the bracket member 98 and not to longitudinally adjust the carriage 101 which carries the lumbar support 99. The bracket member 98 is provided with a plurality of openings 123, 124, 125, 126, 128, 129 and 130 (Fig. 16), into which are inserted tubes to support various appliances which will be hereinafter discussed. In order to support the head rest 100 (Figs. 1, 2, and 20) tubes 131, 132, and 133 are connected at one end with the head rest 100 and the other end portions interfit in openings 123, 124, and 125 respectively (Fig. 16). Also, the openings 123, 124, 125, 126, 128, 129, and 130, are arranged to provide a plurality of patterns and the appliance posts which fit therein each have mating patterns to certain sets of openings which prevent insertion of an appliance post in the wrong location.

Referring to Fig. 1, two traction frames are illustrated and numbered generally 134 and 135 respectively. As the traction frame 134 will be used in connection with the left side of a patient, it will be referred to as the left traction frame and 135 will be referred to as the right traction frame. Each of the traction frames 134 and 135 comprises tubular members 136 and 137 which telescopically receive removable tubular members 138 and 139 respectively. The inner ends of the tubular members 136 and 137 are rigidly secured to a yoke 140 which is substantially U shape in plan (see Fig. 1). The yoke 140 carries a rack member 141, which is mounted for longitudinal sliding movement in a housing member 142, see also Fig. 14. Within the housing member 142 is a worm 143 which operatively engages the teeth of the rack member 141 and rotation of the worm 143 in opposite directions provides for longitudinal movement of the rack 141 in opposite directions. Angular movement of the worm 143 is accomplished by means of bevel gears 144 and shaft and crank means 145.

Referring to Figs. 2, 3, 14 and 15, the housing 142 is secured by bolt 146 to a bracket 147. Bracket 147 is pivotally connected with a bracket 148 (see also Fig. 3) and is mounted for pivotal movement as respects the same on a vertical axis. The bracket 148 is rigidly connected with mounting block 89. The pivotal mounting means between brackets 147 and 148 comprises a boss 149 (Fig. 3) carried by bracket 147 and which boss 149 is received by a suitable opening in the bracket 148. In order to provide for locking the traction frames against swinging movement in a horizontal plane, a locking screw 150 with a suitable hand engaging lever 151 is provided. The locking screw 150 threadedly engages the boss 149 carried by bracket 147 and thus by tightening of locking screw 150, the brackets 147 and 148 are frictionally urged toward each other and thus clamped together. Obviously, upon release of the locking screw 150, the bracket 147 and the traction frame connected therewith may be swung in a horizontal plane. The housing 142 and the bracket 147 are mounted for relative angular movement as respects each other by bolt 146. In order to insure that angular movement of housing 142 and downward movement of the traction fragment connected therewith is positively limited, a lug 152 is carried by the housing 142 and engages with a lug 153, carried by the bracket 147, when the housing 142 and the traction fragment connected therewith are moved in a downward direction. This position of the parts is illustrated in Fig. 15 of the drawings. However, when the cap screw 146 is loosened then the lug 152 and housing 142 and parts connected therewith may be moved upwardly into the dotted line position shown in Fig. 14 of the drawings. The space numbered 154 in Fig. 15 may be of any suitable length so that the parts can move upwardly the desired extent. As shown in said Fig. 15 approximately 45 degrees is indicated by the space 154. Thus with the particular length of parts as shown, the rack 141 and traction frames connected therewith can be moved about 45° and if this is not sufficient movement for the traction fragment then the bolt 146 can be loosened and then an additional amount of movement of the traction frame can be obtained which, as indicated, may be approximately 45°. It is to be understood that the amount of degrees involved will vary with any particular arrangement of parts. In other words, the longer the rack 141, the more movement can be obtained by the rack 141 and worm 143. For convenience of construction, I find that approximately 45° is sufficient movement for all but exceptional cases and in the exceptional cases the additional movement can be obtained by the operation of bolt 146 as previously explained.

It is highly important to note that the center of curvature of the rack 141 coincides with the axis of shaft 155 as shown in Fig. 2. As appears in Fig. 3 the axis of the shaft 155 is a horizontal line which bisects the point marked X of the bone fragment numbered 156. This bone fragment 156 is the superior fragment and will be discussed more in detail hereafter. At this point it is important to note that the up and down movement of the traction frame 134 in a vertical plane in response to movement of rack 141 and worm 143 is about an axis which coincides with the point marked X of the superior fragment marked 156. Also it is important to note that any in and out movement of the traction frame 134 is about the center of boss 149 which is aligned with a vertical line passing through point X. Thus when it is desired to move the traction frame 134 (and a limb connected therewith, including both the superior and distal fragments) either in and out in a horizontal plane or up and down in a vertical plane, this will be about the point X and thus if traction is directed in line with the same point, the traction force between the superior and distal fragments will not be affected by such movements. Often such movements are needed after traction has been applied between a superior and distal fragment to relieve muscle pull or change the relative positions of the adjacent fractured ends of a fracture and this while the fragments are under traction forces.

The traction frame 135 mates with traction frame 134 and as the mating parts are similar they are given the same numbers. Preferably the traction frame 135 is supported by a rack 157 which has a different curvature than rack 141. If the racks 141 and 157 have the same curvature, that is, they are arcs of circles of the same diameter, then as the traction frames 134 and 135 are moved outwardly, the racks 141 and 157 would tend to engage each other unless unusually short racks 141 and 157 were employed. In order to provide racks of a length to provide the movement generally desired of the traction frames 134 and 135 in horizontal planes, racks 141 and 157 will have a different curvature. However, both racks will have arcuate shaped members which have axes of rotation each of which intersects its point X. The point X will be on the axis of the shaft 155 of the fragment involved. The purpose of having the center of rotation of each of the racks 141 and 157 about an axis which passes through the point X is so that any movement of the traction frame involved, 134 or 135, is about the center of articulation of the upper end of the superior fragment and the traction involved is not changed by such in and out or up and down movement of a traction frame.

Referring to Figs. 1 and 3, a bracket 158 is pivoted to the yoke 140 by pivot means 159. The bracket 158 and parts supported thereby are generally termed a countertraction unit. By this countertraction unit the superior fragment of the bone is held so traction can be applied to the distal fragment, all as is hereinafter specifically described. The pivot means 159 extend in a vertical direction and permit horizontal angular movement of the bracket 158 relative to the yoke 140. Releasable locking means between the bracket 158 and the yoke 140 may be in the nature of a set screw 160 (see Fig. 1), which extends through an arcuate slot 161 and is threaded into the yoke 140. Thus upon loosening of set screw 160 the bracket 158 can be angularly moved relative to the yoke 140 and any desired adjustment between said parts may be maintained upon tightening of set screw 160. Each pivot means 159 is axially aligned with the axis of a boss 149 and thus any movement of a bracket 158 in a horizontal plane will be about an axis intersecting a point X. Thus if a bracket 158 is moved in a horizontal plane relative to a traction frame, as 134, then a superior fragment 156 connected with 158 will move in a horizontal plane about its center of articulation and any correction of the superior fragment in such plane can be made without tending to dislocate the upper end of the superior fragment from a socket of a bone thereabove or changing traction forces if they are present.

The bracket 158 carries at its upper end portion two parallel arcuate racks 162. The parallel arcuate racks 162 and parts associated therewith are shown in elevation in Figs. 2 and 3, in plan in Fig. 1, and in detail in Figs. 10, 11, and 12. The shaft 155 is mounted for sliding horizontal movement and for arcuate movement about a center indicated as X in Fig. 3. As the superior fragment is connected with the shaft 155, any rotation of shaft 155 will result in angular movement in a vertical plane of the superior fragment 156. As such movement is about X and about the center of articulation of the upper end of the superior fragment, we can angularly move the superior fragment in a vertical plane about its center of articulation and without changing any traction forces which may exist between the superior and distal fragments.

Arcuate racks 162 are slidably mounted in a housing member 163 externally thereof. Housing member 163 is provided with grooves to receive therein and slidably support the racks 162. Also, said housing member 163 is provided with a recess to receive therein block 164, a gear or pinion 165 meshes with the teeth of the arcuate racks 162 and said gear or pinion extends across and is journaled in the housing 163. The gear 165 is provided with a suitable thumb screw 166 for turning said gear 165. The gear 165 extends through the block 164 and functions as a pivotal support for the lower portion of said block 164. The upper portion of block 164 is provided with a slot 167 through which passes a clamping screw 168. The end of the clamping screw 168, which is remote from the head thereof, is threaded into housing 163. The housing 163 is split as by slot 169 to allow the housing 163 to be clamped against the block 164 and racks 162. By angularly moving shaft 155 with gear or pinion 165 as a pivot, any desired adjustment may be made and after the desired adjustment is made, then by turning lever means 170 connected with clamping screw 168, the housing member 163 may be tightened against the racks 162 and against the block 164. Upon tightening of clamping screw 168, the angular movement of the shaft 155 about the gear or pinion 165 and relative movement between the housing 163, racks 162, and block 164 is prevented.

The block 164 is also split along slot 171. Said block is provided with a sleeve member which is cylindrical on its exterior surface and is provided with a longitudinal opening having a square cross section. The longitudinal opening in the sleeve member 172 slidably mounts the square shaft 155. A locking screw 173 extends crosswise of block 164 and has its end opposite the head end threadedly engaged with one portion of the block 164. The other end of the locking screw 173 is provided with lever means 174 and upon tightening of the locking screw 173 by the lever means 174, the two parts of the split block 164 are securely clamped on the sleeve 172 and thus prevent rotary movement of the sleeve 172. Thus, by means of locking screw 173, the sleeve 172 and shaft 155 and in turn the superior fragment 156 can be first angularly moved in a vertical plane and any adjusted position can be locked and maintained.

A transverse pin 175 locks sleeve 172 against longitudinal movement in block 164. Locking screw 176 is provided to lock square shaft 155 against longitudinal movement in sleeve 172. Thus upon unlocking of screw 176, the square shaft 155 may be moved inwardly or outwardly to connect with a transfixion unit 179 secured to a bone fragment. Transfixion units are employed in connection with skeletal fixation as is hereinafter more particularly described. Also, if the locking screw 168 is loosened, then it is possible to angularly move shaft 155 about gear 165 as a pivot. Thus, the inner end of the shaft 155 can be angularly moved up and down. With this combination of movements it is always thus possible to connect clamping means carried by the inner end of shaft 155 with a transfixion unit.

Thus after the center of articulation of a superior fragment has been adjusted laterally and vertically over the point X, the shaft 155 can be moved in or out or up or down and can be connected with the transfixion unit secured to such fragment despite the size of the patient or the size of the particular bone involved or the particular position of a transfixion unit connecting means.

Springs 177 are pivotally mounted on clamping screw 168 and frictionally engage the teeth of arcuate rack members 162 and frictionally bind the housing 163 and parts carried thereby with the arcuate racks 162. The shaft 155 is provided with a lever 178 for manipulation of said shaft 163 in longitudinal and rotary directions. As both the left and right hand sides of the device are duplicates, as to the parts now being described, similar numbers are given to similar parts on both sides of the device.

It is desired in this invention to provide three movements of the superior fragment about its center of articulation—one movement to provide for rotational corrections of the superior fragment, another movement in a horizontal plane to provide for angular correction in a horizontal plane or lateral-medial correction, and another to provide for angular correction in a vertical plane or posterior-anterior correction. Each of these movements is about the common point X or the center of articulation of the superior fragment.

The bone has first been positioned with its center of articulation coinciding with the point X. To so position a bone, the sidewise movement will be manual and the vertical movement may be by means of an adjustable support, as a sacral rest, shoulder rest, or the like, which will be hereinafter discussed. As the arcuate racks have their center of curvature coinciding with said point X, then any angular movement of the shaft 155 due to movement of housing member 163 along racks 162 will be movement in an arc about X as a center and thus rotational corrections of the superior fragment are made about the point X. As pivot means 159 which support the racks 162 has its axis coinciding with the point X, any angular movement of the racks 162 and the bone fragment connected therewith will be angular movement of the bone fragment in a horizontal plane about the point X and will provide for lateral-medial correction of the superior fragment. Also as the axis of rotation of the shaft 155 passes through the point X, any rotary movement of the shaft 155 and in turn angular movement of the bone fragment in a vertical plane, will be movement about the point X and will provide for angular correction of the bone fragment in a vertical plane or posterior-anterior correction.

Locking means are provided to lock the superior fragment in any of its various adjusted positions. For example, the clamping screw 168 permits locking of any rotational correction which is made, locking screw 160 provides for locked adjusted correction in a horizontal plane and locking screw 173 permits locking of any adjusted angular position in a vertical plane or posterior-anterior correction.

As will be noted from the foregoing the superior bone fragment can be rotated or moved sidewise or up and down all about a common point X. Often it is desired to move the entire limb sidewise or up and down and this may be accomplished by moving a traction frame 134 or 135 either in a horizontal plane or vertical plane. To move the traction frame 134 in a vertical plane, I have provided the racks 141 and 157 each of which have been previously described. The center of the curvature of each rack 141 coincides with the point X at its side of the device. Also in order to swing the traction frame 134 or 135 in a horizontal plane, the center of movement is about the boss 149 which has its center of rotary movement passing through the point X at the side of the device involved. Thus if it is desired to angularly move the whole limb either up or down or in or out for the convenience of the operator or to place the limb at an angle where a minimum muscle tension or a desired muscle tension is involved, this can be done and at the same time always about the center X so that if the limb involved is under traction, there will be no changing of the traction. Thus if a problem arises because of the position of the entire limb this problem can be eliminated without the complication involved from the changing of traction at the time.

By way of example many references have been made to moving the center of articulation of a superior fragment about point X. This of course refers to a fracture case. Often in orthopedic surgery, operations do not involve fractures. Thus the device can be employed and the manipulations will be of the superior end of a bone about a point X and such will be understood as included where reference is made to a superior fragment moving about point X.

The traction frame 134 which was previously generally described will now be described in detail. The removable tubular members 138 and 139 carry a bracket 180. The bracket 180 is preferably detachably and adjustably connected to the tubular members 138 and 139 by split sleeves 181 and locking screw 182. By loosening locking screws 182 the sleeves 181 may be longitudinally adjusted relative to the tubular members 138 and 139. The preferred shape of the bracket 180, as will appear from the plan view, Fig. 1, and the elevation, Fig. 2, is that the same extends upwardly and outwardly, rearwardly and transversely on each side. The upper medial portion of the brackets 180 is provided with a sleeve through which extend threaded shaft 183. As the shaft 183 and parts associated therewith are employed to provide traction on the distal fragment 188, such are generally termed a traction unit and will be now described. Referring to Figs. 5 and 6 which show the detail of the mounting means employed in connection with mounting the shaft 183 in bracket 180, a sleeve 184 is rotatably mounted in bracket 180 and sleeve 184 carries internal splines which are shown in Fig. 6 and which internal splines interfit in grooves 185 of threaded shaft 183 and thus prevent rotary movement of the threaded shaft 183 as respects the sleeve 184. An opening is provided in bracket 180 to slidably receive locking block 186 and said block 186 is provided with an opening to permit locking screw 187 to pass therethrough and said locking screw threadedly engages bracket 180. Thus upon tightening of locking screw 187, the locking block 186 will be urged against and frictionally engage sleeve 184, thereby preventing rotation of sleeve 184 and in turn preventing rotation of threaded shaft 183. The threaded shaft 183 is connected by means hereinafter described with the distal fragment 188 of a bone and thus if locking screw 187 is loosened it is possible to angularly move threaded shaft 183 about its axis and in turn to provide for angular correction of the distal fragment. If it is desired to lock the distal fragments 188 against angular movement, this can be accomplished by tightening locking screw 187. However, in the operation of my device generally the locking screw 187 will be loosened during reduction of a fracture. The threads on shaft 183 are preferably of the type generally termed square threads or acme threads and a slight pitch is employed. Thus there is only a slight tendency for the traction nut 189 which is mounted on threaded shaft 183 to turn said threaded shaft as the traction nut 189 is tightened. Furthermore, there will generally be a portion of the anatomy extending below the traction unit and as the center of mass of the weight is below the traction unit, this will tend to offset any tendency of shaft 183 to turn when the locking screw 187 is released and tension is applied by tightening of the traction nut 189.

The sleeve 184 turns freely in bracket 180 and in practice I have found that it is not necessary to provide antifriction bearing means between the sleeve 184 and the bracket 180 but it is to be understood that if desired antifriction bearing means can be disposed between such parts.

Referring to Figs. 1, 2, and 9 the inner end of the threaded shaft 183 is rigidly connected to a plate member 190 (see Fig. 9), which plate member is pivotally connected to pivot 191 in bracket 192, which bracket is substantially of U shape in section and the plate 190 is slidable between the upper and lower leg members of the bracket 192. In order to lock the plate 190 and the threaded shaft 183 connected therewith to the bracket 192, a locking screw 193 is provided. Thus locking screw extends through one leg of the bracket 192, through the slot 194 in plate 190 and is threaded into the other leg of the bracket 192. Thus upon tightening of locking screw 193 angular movement between the plate 190 and threaded shaft 183 rigidly carried thereby as respects the bracket 192 may be prevented. Normally the plate 190 and the leg members of the bracket 192 extend in a horizontal plane so that movement of the leg members of the bracket 192 and parts connected therewith in a horizontal plane will be reflected by movement of the distal fragment 188 in a horizontal plane. The connection between the bracket 192 and the distal fragment 188 will be hereinafter described but at this point it is to be noted that if the bracket 192 is positioned in its normal position then such pivotal movement of the bracket 192 will result in lateral-medial correction of the position of the distal fragment 188 during reduction of the fracture. At this point it is further important to note that rotational correction of the distal fragment is accomplished by turning of the threaded shaft 183 and such rotation is on an axis which intersects the axis of pivot 191 and also that lateral-medial correction of the fragment is on an axis which intersects the axis of the pivot 191.

Two stub shafts 195 are rotatively mounted in bracket 192 and are keyed to a yoke 196, which yoke has leg members which span the bracket 192. Thus the yoke 196 is rotatable as respects the bracket 192 and on an axis which passes through the intersection of the axes of pivot 191 and shaft 183. Thus universal movement is provided where the three axes intersect at a common point.

From the foregoing description, the traction unit comprises shaft 183 which is rotatable about its axis, plate member 190 connected with shaft 183 and pivoted at 191 to bracket 192, and traction unit 201 which are carried by stub shafts 195 which are rotatively mounted in bracket 192. Thus the traction frame is mounted for at least angular movements in horizontal and vertical planes and for rotation about a common point. This is particularly true of the construction shown in Figs. 1, 2, and 5 to 9 inclusive. The common point around which said parts are movable is alined with the point marked X on Fig. 3 of the drawings about which the parts of the counter-traction unit move.

It is desired that the stub shafts 195 shall be freely rotatable or adjustably locked in any desired angular position. A locking and adjusting means is shown which comprises a bracket 197 which is rigid with bracket 192, a clamp 198 at the upper portion of bracket 197, a locking screw 199, and a shaft 200 which is mounted for sliding movement in clamp 198 and which may be locked in any desired position therein by locking screw 199. Shaft 200 is pivoted to yoke 196 and yoke 196 is keyed to stub shafts 195. The outer ends of the stub shafts 195 are connected with a transfixion unit numbered generally 201 and such transfixion unit connects with the distal fragment 188. At this point the transfixion unit employed will be not considered in detail and merely by way of example I have shown transfixion unit 201, employing full pins to connect with the distal fragment, and I have shown a transfixion unit 179, employing half pins to connect to the superior fragment. Transfixion units will be discussed hereinafter. At this point it is important to note that as far as the distal fragment 188 is concerned that whether the distal fragment is rotated, or is moved in a horizontal plane, that is, for lateral-medial correction, or is moved in a vertical plane, that is, for posterior-anterior correction, that all movements are about axes which intersect at a common point. Further, it is important to note that any one of the three movements, or a selected number thereof, may be either freely movable or may be locked.

As it is uncommon to reduce fractures on two limbs at one time, I have shown in Figs. 1 and 2 apparatus to reduce a fracture of the left leg and with a leg board 202 merely to support the right leg. However, it is to be understood that the leg board may well be on the side to support the left leg and the transfixion unit and parts connected therewith may be on the right side of the device and connected to the right traction frame 135 to reduce a fracture in that area.

Each of the removable tubular members 138 and 139 is preferably provided with locking means to lock the same on tubular members 136 and 137. This locking means may comprise a split sleeve 203 carried rigid with a tubular member 138 or 139 and provided with a locking screw 204 to clamp the same on a tubular member 136 or 137. As the traction nut 189 is tightened to provide traction, the split sleeve 203 and locking screw 204 will connect the tubular members 138 and 139 with tubular members 136 and 137 and thus provide suitable countertraction. Also, the bracket 180 may be removed and rotated 180° before reassembling on the tubular member 138 and 139. As the bracket 180 extends in a direction which appears rearward in Figs. 1 and 2, longer bones can be set when the bracket 180 is positioned as shown in said Figs. 1 and 2. At the same time when said bracket 180 is rotated 180°, the same can be used to reduce fracture on smaller bones. This construction permits tubular members 136 to 139 to be of a minimum length and yet of such variations in extensibility that operations may be performed with the use of my device on small as well as on large bones and yet the tubes can be kept within suitable dimensions.

Referring to the means for adjustably positioning a leg board 202 on tubular members, as removable tubular members 138 and 139, this assembly is shown by dotted lines in plan in Fig. 1, in elevation in Fig. 2, and partly in elevation and partly in section in Fig. 13. In each of the foregoing instances the said assembly is mounted on removable tubular members 138 and 139 but it is to be expressly understood that it may be mounted on the tubular members 136 and 137.

This structure may be similar to the assembly shown in Fig. 17, which assembly is used for vertically positioning the lumbar support 99. However, as an embodiment of the means which may be used for positioning the leg board 202, I have shown a structure in the various figures as above mentioned. In said figures, two vertically positioned threaded shafts 205 and 206 are shown, each of which has its upper end portion pivotally connected with the leg board 202. Preferably one of the shafts 205 or 206, such as 206 as shown, is connected with the leg board 202 by means of cross pin 207 and slot 208. Thus the leg board 202 may be tilted as well as vertically adjusted, so that said leg board is horizontal or is at an incline to the horizontal and either end may be higher than the other and sufficient movement is provided to accomplish such purpose by reason of cross pin 207 movable in a general horizontal direction in the slot 208.

The shafts 205 and 206 extend downwardly through carriage housings 209 and 210 respectively. Each carriage housing 209 or 210 is supported and releasably locked to tubular members 138 and 139 in a manner similar to that in which the carriage 101 is releasably locked to tubes 97 as shown in Fig. 17. In other words, I provide a U-shaped bracket 211 on each carriage housing 209 and 210, shown on housing 210 in Fig. 13, and such U-shaped bracket 211 is similar in function and structure to the U-shaped brackets 102 of Fig. 17. The other end portions of the carriage housings 209 and 210 end in lugs 212 which ride on tubular members 138 and 139 function in a similar manner to that of the carriage 101 on tubular members 97 in Fig. 17. A lock and release mechanism similar to that shown in Fig. 17 is employed in connection with the structure of Fig. 13. However, all of the details are not shown in Fig. 13 in the interest of clarity and only the latch member 213 which corresponds in function to the latch member 104 and the lever 214 which corresponds in function to the lever 106 are shown. Preferably the leg board elevating assemblies just described are mated so that the crank 215 for rotating bevel gear 216 and in turn raising or lowering one end of a leg board 202 as well as the latch members 213 and levers 214 are always to the outside of the machine and are therefore in a position to be readily manipulated.

Referring to the sacral rest which is numbered generally 217 and is shown throughout various figures and in detail in Fig. 18, this sacral rest comprises an externally threaded post 218 which is suitably secured to the mounting block 89 to prevent rotary and vertical movement between the post 218 and the mounting block 89. This may be accomplished by any suitable means such as is shown in the nature of a cross pin 219. The upper end portion of the post 218 is provided with external threads which mesh with the internal threads of an adjusting nut 220. A sleeve 221 is socketed in adjusting nut 220 to move vertically with said adjusting nut 220. The sleeve 221 is provided with a key member 222 which slidably interfits with a longitudinal slot 223 (Fig. 19) carried by the threaded portion of the sleeve 218. Key 222 and slot 223 cooperate to prevent sleeve 221 from rotating with adjusting nut 220. Preferably the slot 223 is of a length less than the threaded portion of the post 218 and thus the minimum and maximum vertical positions of the nut 220 and in turn the sacral rest 217 relative to the post 218 are established.

Preferably the sleeve 221 telescopically receives a boss 224. As the post 218 is keyed to the mounting block 89, and the post 218 is keyed to the sleeve 221, the sleeve 221 is locked against rotary movement. In order to lock the boss 224 to the sleeve 221 any suitable means may be employed, such as a lug 225 carried by the sleeve 221. The lug 225 interfits with a recess carried by the boss 224. A U-shaped bracket is formed integral with the boss 224 and an arm portion 226 functions as a casette holder base. On the upper surface portion of the arm portion 226 the usual casette equipment (e. g. X-ray plates) may be placed to enable the operator to take X-ray pictures when desired. The arm portion 226 is connected with a deck portion 227 which functions to receive the sacrum of a patient and thus functions as a sacral rest. The portion 227 is provided with an opening 228 into which is interfitted a perineal post 229. The perineal post 229 may be made in any usual form and generally is provided with suitable padding as indicated. The opening 228 should be of a form to receive the shaft of the perineal post 229 so that rotary movement is prevented. An appropriate way of accomplishing this purpose is to provide the opening 228 of a form so the same is square in section.

As it is necessary in taking X-rays to provide a predetermined spaced relation between the casette holder positioning the X-ray film and the support for the patient, the distance between the upper surface of portion 227 and the upper surface of arm portion 226 will be determined with such in mind. If it should be desired to provide additional space between the arms 226 and 227 for passing bandages or cast forming materials therebetween, the space may be enlarged and a detachable casette holder base provided in the space. Such structure is applicable whether a child's sacral rest or an adult's sacral rest is employed. Thus by way of illustration I have shown in Fig. 28, a detachable casette holder base but it is to be understood that such detachable casette holder base is not to be limited in its use to either a child's sacral rest or an adult's sacral rest.

Referring to Figs. 27 and 28, a modified sacral rest is shown which is designed particularly for use in connection with infants and children. This sacral rest is supported by sleeve 221 in the same manner that the sacral rest shown in Fig. 18 is supported and for such reason parts have been broken away and similar parts have been given the same numbers as appear in Figs. 18 and 19.

Referring to Fig. 1 of the drawings it is to be noted that the portion 227 of the sacral rest is centrally positioned between the location where the ball socket joints of two femurs will be positioned. An average adult has a spread of substantially eight inches between the ball socket joint of both femurs. With children the average will be approximately five inches and with infants still less. Thus if the same fracture machine is to be employed to reduce fractures of adults as well as children and infants, it is necessary to offset the sacral rest employed for children and infants so that the sacral rest will be in a position to support the sacrum of a child or infant when the ball socket joint of a femur of a child has been horizontally adjusted to align with point $x$, as has been hereinbefore described in connection with the femur fragment 156. This alignment is maintained if the sacral rest is arranged to properly support sacra of patients of various sizes. Also, it is necessary to adjustably elevate the ball socket joint of the femur to align the ball socket joint with the point $x$. Also, the buttocks of a child is narrower than that of an adult and the sacral rest portion must be smaller so that as a cast is wrapped around the sacral rest it will properly fit a child.

With such conditions in mind reference is again made to Figs. 27 and 28 and the boss 230 is provided with an arm 231 at its upper portion and with two recesses 232 and 233, which said recesses are offset as respects each other 90°. Thus, as indicated by full and dotted lines in Fig. 27, when the recess 232 engages lug 225 the sacral rest portion 234 of the device will be in the full line position and the machine will be set to operate on the left leg. When the arm 231 is turned so that the recess 233 registers with the lug 225 then the deck portion 234 of the sacral rest will be in the dot and dash line position shown in Fig. 27 and the fracture machine will be set so that operation can be made on a right leg.

The arm 231 is provided with recesses 235 and 236 to receive therein a shaft 237. The shaft 237 and the interfitting recess in the arm 231 are of a shape and form so that rotary movement between the two parts is prevented. Again an appropriate way of providing such results is to provide the shaft 237 with a shape so the same is square in cross section. The shaft 237 carries a U-shaped sacral rest which comprises an arm portion 238 and another arm portion or sacral rest deck 234. If it is desired to provide substantial spacing between the upper surface of the arm portion 238 and the upper surface portion of the arm portion 234, then a detachable casette holder can be employed so that the spacing between the upper surface of the casette holder and the upper surface of the deck or arm portion is that desired in X-ray photography. A detachable casette holder may be in the form of a deck portion 239 and supports 240 which are telescopically received in suitable openings in the arm portion 238. Preferably these are in the side rather than the top to minimize the deposit of cast forming material therein. The purpose of the detachable or removable casette holder 239—240 is so that maximum room may be provided between the casette holder base and the arm or deck portion which functions as a sacral rest and at the same time to permit X-ray film to be suitably positioned as respects the level of the sacral rest deck. Thus while I have shown the detachable casette holder in Fig. 28, obviously such structure is equally applicable to an adult's sacral rest.

As a perineal post fits the crotch of a patient obviously different spreads will be involved and it is desirable to provide a child size as well as an adult size perineal post. When a perineal post is used in connection with the sacral rest shown in Fig. 18, said perineal post 229 interfits with square opening 228. When a perineal post is used in connection with the sacral rest of Fig. 28 such perineal post interfits with an opening 241 in the deck portion 234 of the sacral rest. The opening 241 may be square in cross section and will function similarly to the opening 228 of Fig. 18.

The arm 231 of Figs. 27 and 28 is provided with openings 235 and 236 each of which may receive shaft 237. For infants the shaft 237 can interfit with opening 235 and for children or a size intermediate an infant and an adult, then said shaft 237 may be interfitted with an opening 236. Thus in case of hip operations the center of the patient can be moved sidewise and still be supported on a sacral rest with the center of articulation of the bone involved at the point X.

In the event that an operation is being performed on a shoulder joint, then the same arm 231 can be employed and the shoulder rest shown in Fig. 29 may be employed. The said shoulder rest shown in Fig. 29 has a square ended portion 242, a shaft 243 which supports a shoulder rest 244. In the event that a patient is aligned on the table so that a shoulder joint of a patient is aligned with one of the points X, then the support or shoulder rest 244 will be between the scapula of a patient and the shoulder rest 244 may be thus termed an interscapulae rest. This rest 244 is preferably provided with a flexible member 245, (see also the parts 244 and 245 in perspective in Fig. 25). The function of the flexible member 245 is so that if a cast is provided about the patient where the shoulder rest 244 is supporting the patient, then the shoulder rest 244 may be moved out of the cast by using the flexible member 245 as a retrieving means. While I have shown two openings 235 and 236 in the arm 231, it is to be understood that this merely exemplifies a plurality of openings and a greater number may be employed if desired. As the shoulder rest or interscapulae support 244 can be supported from any of the square openings so provided, this provides for lateral adjustment so that patients of all sizes can be well handled with the use of the same shoulder rest of Fig. 29. As the distance between the shoulder joints of an adult is greater than the distance between his hip joints, the arm 231 will be in its dot and dash line of Fig. 27 when the structure of Fig. 29 supports a patient for an operation on the left side. In order to adjust the elevation of the shoulder rest 244 it is to be noted that the shoulder rest is supported by the sleeve 221 and that in each instance the sleeve 221 is adjustable vertically by means of the adjusting nut 220.

In order to support overhead accessories, a shaft 246 is provided, see Fig. 31. If the shaft 246 is to be inserted through the opening 247 (see Figs. 1, 18 and 31), then the shaft 246 is provided with boss means 248 which interfit with slots 249 (Fig. 1) in the sacral rest portion 227. Also, if said shaft 246 is employed in connection with the sacral rest of Fig. 18, the lower portion of the shaft 246 will enter an opening 250 in the boss 224.

If the shaft 246 is employed in connection with the sacral rest shown in Figs. 27 and 28, then the shaft 246 will be provided with a suitable end portion to interfit with a square opening 251 in the deck 234 of the sacral rest and pass therethrough and also be supported in a recess 252 in the arm portion 238 of the sacral rest. In either instance and regardless of the sacral rest being employed, the shaft 246 will be supported for vertical adjustment by reason of nut 220 and also will be non-rotatably held by the sacral rest. Whenever the shaft 246 is used in connection with a sacral rest employing a detachable cassette holder as indicated in Fig. 28, then the cassette holder 239 will be removed before the shaft 246 is appropriately positioned to be supported by the sacral rest.

The shaft 246 at its upper end supports a plurality of horizontal shafts 253, 254, and 255. Each of said shafts 253, 254 and 255 is longitudinally adjustable and angularly adjustable about the vertical shaft 246. Thus if it is desired to support a patient at a plurality of locations from overhead supports, the shaft 253 can be longitudinally adjusted relative to the shaft 246 and then a spreader 256, shown in elevation in Fig. 34 and also shown in elevation at right angles to the showing of Fig. 34 in Fig. 31, is employed. This spreader is preferably provided with nut and threaded shaft means 257 and 258. The lower portions of the spreader 256 are preferably connected with a sling 259 by buckles 260, which buckles are preferably carried by the spreader 256.

As indicated in Fig. 31 an intermediate portion of the back of a patient may be supported by a sling 259 carried by horizontal shaft 253 and relative vertical adjustment of the sling can obtain by reason of the buckle adjustment or by reason of the nut 257.

If it is desired to support one or more legs of the patient, then shaft 254, by way of example, can carry a spreader 261 shown in elevation in Fig. 33 and also shown in elevation, at right angles to the showing in Fig. 33, in Fig. 31. Sling and buckle means, generally numbered 262, which may be similar in construction to the parts 259 and 260 are employed in connection with the spreader 261. Thus if it is desired to support the leg of a patient as indicated in Fig. 31, the leg may be supported from one of the horizontal shafts 254 or 255. The left leg has been shown supported by horizontal shaft 254 and by similar structure obviously the right leg can be simultaneously supported from the shaft 255 if desired.

If it is desired to support a patient between the scapulae or provide an interscapulae support, when the patient is on the fracture device as illustrated in Fig. 31, then a shaft 263 is provided and such shaft carries a nut and threaded shaft means 264 and 265 so that vertical adjustment can be provided. The shaft 263 has its lower end portion telescopically received within an opening 126 which is shown in Fig. 16 of the drawing. At the top of the threaded shaft 265 is positioned the shoulder rest 244 shown detached in Fig. 25 of the drawings. The lower end portion of the shaft 263 interfits with the round hole 126 and the recess 127 of Fig. 16 so that rotary movement of the shaft 263 relative to bracket member 98 is prevented.

If it is also desired to support the neck of a patient as indicated in Fig. 31 of the drawings, a post 266 is provided (see also Fig. 24 of the drawings, which is a view in elevation at right angles to the view in elevation shown in Fig. 31) and the lower portion of the shaft 266 interfits with and is held non-rotatable by the opening 128 shown in plan in Fig. 16. The shaft 266 is connected with nut and threaded shaft means 267 and 268 respectively to provide for vertical adjustment of the neck rest member 269. Preferably the rest member 269 for the neck or cervical spine is of wedge shape tapering in a diverging manner away from the top of the neck support so that if a cast is provided about the wedge shaped member 269, said member 269 can be readily removed from the cast and merely leave an opening in the cast. The top of the neck support may be small enough to provide an opening within clinical tolerances and yet not to reduce the strength of the cast below clinical requirements and at the same time reasonably comfortable to the patient.

As indicated in the drawings the construction is such that shafts 263 and 266 are non-rotatively mounted in the bracket member 98 and also, as best shown in Fig. 24, a construction is provided so that turning of the nuts 264 and 267 will not use a turning movement of the shoulder rest 244 nor the neck rest 269.

As further indicated in Fig. 31, it is possible at the same time to employ one or more leg boards 202 which were described in connection with Fig. 2 of the drawings to support the legs, or a leg of a patient and at the same time the sacrum of the patient may be supported by the sacral rest deck portion 227.

Referring to Fig. 32 of the drawings, parts of the apparatus previously described are shown in a different assembled relation. The mounting block 89, sleeve 221, and the adjusting nut 220 are shown in the same manner as said parts are shown in Fig. 18. However, for convenience the boss 224 and sacral rest supported thereby have been removed and in their place a sleeve 270 is shown. The sleeve 270 is of a size to receive and support the shaft 246 which was described in connection with Fig. 31 of the drawings. The upper portion of the shaft 246 supports the shaft 253 in the same manner in which it was shown in connection with Fig. 31 except that the shaft 253 has been adjusted longitudinally of its length and has been angularly moved in a horizontal plane approximately 180°. The shaft 253 supports the threaded shaft 258, nut 257 and spreader 256 similar to the manner in which they were described as supported in connection with Fig. 31.

Referring to the spreader 256, which is shown also in Fig. 34, a hook member 271 is indicated. This hook member 271 suspendedly supports a head sling, commonly called a "Glissen" sling, and adjusted vertical tension can be applied to the spine of a patient in the manner illustrated in connection with Fig. 32 of the drawings. Tension can be provided either by adjusting nut 257 or nut 220. If desired, the patient can engage the arms of the spreader 256 by his hands. This will permit the patient to adjust the pressure being employed and at the same time will get the patient's arms out of the way as a cast is being applied. Generally it is desired to remove the sacral rest shown in Fig. 18 and merely employ the sleeve 221 with the sleeve 270 thereon. However, if it is not desired to have the patient so near the table because of a lighter weight patient or the like, then the sacral rest of Fig. 18 can be used and the shaft 246 will be supported in the manner shown in connection with Fig. 31 of the drawings.

Referring to Fig. 26 of the drawings, a support 272 for the spine of a patient is shown. The end portion of the support 272, which carries the slot or opening 273, rests on the sacral rest deck portion 227 and is supported thereby. The opening 273 is of a size to permit either or both the shaft 246 and the perineal post 229 to pass therethrough. In order to provide for adjustment of length, the other end portion of the support 272 is provided with a plurality of spaced openings 274 any one of which is received by a suitably shaped top portion on shaft 266. The support 272 is preferably relatively rigid, as being formed of "Bakelite," and thus provides suitable support to the spine of a patient. Referring to Fig. 31 of the drawings, it will be apparent that the support 272 of Fig. 26 can be readily inserted in place with the shaft 265 supporting one end portion of the support 272 and with the deck portion 227 of the sacral rest supporting the other end portion of said support 272. Thus, if it is desired to support the spine of a patient when a cast is being wrapped around the patient's body, then the member 272 of Fig. 26 may be employed and after the cast has been properly constructed about the patient, then the member 272 may be pulled out of the cast. A cast fitted about the body of a patient is such that by turning the patient, then a member as 272 or 244 can be slid between the patient and the cast and removed. If it is not desired to employ the support 272 to support the spine of a patient and it is desired to provide an interscapulae support, then the member 244 shown in Fig. 25 of the drawings may be employed in the manner illustrated in either Fig. 23 or Fig. 31 of the drawings and if a cast is positioned about the body of a patient, then by the use of the flexible strap 245, the shoulder rest 244 may be removed after a cast has been wrapped about the patient.

Often it is desired to arch the back of a patient or provide hyper-extension when a cast is being applied. This may be accomplished by employing the structure shown in detail in Figs. 21 and 22 and shown in operative position in Fig. 20. The head rest 100 is provided with a bracket 275 which carries a plurality of pins 276. A plurality of resilient spine supporting members 277 are employed and these may be made of any suitable material such as flexible steel. Each of the spine supports 277 is provided with notches which interfit with pins 276. The foregoing illustrates one manner in which the spine supports 277 may be detachably secured to the head rest 100. The other end portions of the supports 277 are detachably secured to the deck portion 227 of the sacral rest. One suitable way in which this is accomplished is by providing a bracket 278 provided with pins 279 each of which interfits with a groove in an end portion of a support 277 and provided with pin means 280 which interfits with a notch 281 in the deck portion 227 of the sacral rest. Obviously members 277 and 278 may be permanently joined together, if desired, and the unit removed from a cast by drawing it toward the feet of a patient.

From the foregoing construction it will be apparent that as the head rest 100 and the sacral rest deck portion 227 are moved relatively toward each other, then the spline supports 277 may be arched an amount depending upon the relative movement of said parts 100 and 227 toward each other. The means indicated for moving the head rest 100 relatively toward the deck portion 227 of the sacral rest comprises mechanism previously described in connection with Figs. 16 and 17. In said figures and in Fig. 3, it was indicated that the screw 118 was threadedly supported by the mounting block 89. As the block 89 supports the sacral rest deck portion 227 in a position relatively fixed longitudinally considered, then movement of the bracket member 98 toward and away from the block 89 will provide the desired relative movement. As the bracket member 98 supports the head table 100, then turning movement of the screw 118 in response to the turning of crank 122 will provide for adjusting the relative position between the head rest 100 and the deck portion 227 of the sacral rest and in turn will provide for the desired flexing of the spine support 227 and in turn the desired arching of the spine of a patient.

The head of a patient can be supported either with the face up or the face down. Referring to Fig. 23 of the drawings, the patient is indicated with the head being supported with the face upward and in Fig. 30 a fragment is indicated showing a structure supporting the patient with the face down. The post 282 of Fig. 23 may be identical with the post 266 of Fig. 24. Similarly the nut 283 and threaded shaft 284 of Fig. 23 may be similar to nut 267 and threaded shaft 268 of Fig. 24. The threaded shaft 284 supports an L-shaped bracket 285 which in turn supports a cup shaped head rest 286. As the head rest 286 fits the head of a patient and in view of the L-shaped bracket 285 a cast may be placed about the back of the head of a patient when desired and then the head rest and parts connected therewith can be angularly moved around the top of the head of a patient and be removed from underneath a cast. The post 282 at its lower end interfits with the opening 125 which is best shown in Fig. 16 of the drawings. Obviously, rotation of the nut 283 will provide for vertical adjustment of the head rest 286.

Referring to Fig. 30 of the drawings, the head rest is supported by the same threaded shaft 284 which is shown with its various supporting members in Fig. 23. Thus in Fig. 30 only a fragment of the threaded shaft 284 has been shown. The shaft 284 supports a head rest 287 which is generally U shape in form and its ends extend upwardly and outwardly and then are provided with inwardly bent portions. The sides are open to permit bandages or cast forming materials to pass therethrough. The inwardly bent portions are covered with suitable cushioning material 288 and said cushioning material functions to support the head and chin of a patient.

Referring again to Fig. 23 of the drawings, an extension member 289 is suitably connected with the bracket member 98 (see also Fig. 16). The means indicated for such connection comprises bolt and nut means 290 operating in opening 130 and a stud 291 operating in opening 129. (Both said openings being best shown in Fig. 16 of the drawings.) Extension member 289 carries an upright post 292 which upright post carries threaded shaft and nut means 293. The threaded shaft and nut means are mounted on post 292 preferably so that the shaft will not rotate but can be moved horizontally by rotating movement of the nut means. The inner end of the threaded shaft carries a hook member 294 which in turn may be connected to a head sling or "Glisson" sling which was previously described in connection with Fig. 32.

Also, in Fig. 23 the shoulders of a patient are shown supported by the same means as are indicated in Fig. 31 of the drawings, namely, shaft 263, nut 264, threaded shaft 265, and shoulder rest 244. Also, the sacrum of the patient is shown as being supported by the sacral rest deck portion 227 and the legs of the patient are shown as being supported by leg boards 202.

In Fig. 23 of the drawings, tension or traction is being applied to the spine of a patient. Thus means are employed to secure the feet of the patient to the foot of the fracture table so that relative movement between the patient's feet and head can be accomplished. The bracket 180 which was described in connection with Fig. 1 of the drawings is employed in Fig. 23 of the drawings. The form of foot engaging means shown in Fig. 23 of the drawings is a subject matter of my copending application Serial 622,785, filed Oct. 17, 1945, now Patent No. 2,469,361, and for the purpose of the present invention the details thereof are not important. Generally, said means to engage the feet of a patient may comprise a threaded shaft 295, nut means 296 which are supported for longitudinal movement by the bracket 180 so that the threaded shaft 295 may move longitudinally but will not turn relative to the bracket 180. The inner end of the threaded shaft 295 supports a bracket 297 which in turn supports a foot plate 298. Strap means 299 are wrapped about each foot of a patient and thus connect each foot of a patient to a foot plate 298. Where the apparatus is employed in the manner illustrated in connection with Fig. 23, obviously each foot of the patient will be strapped to a separate foot plate 298. Also, it will be apparent from the construction shown in Fig. 23 that traction may be applied to the spine of a patient by operating either nut means 296 or the nut and threaded shaft means 293. The one which is preferably operated is the one which will maintain the head of the patient in the head rest.

Figs. 35, 36, and 37 disclose means used in connection with this fracture table for exerting lateral traction in opposite directions to correct simple or multiple lateral curvatures of the spine. This means comprises a carriage 300 adapted to be adjustably supported on the tubes 97 of the extension frame in a manner similar to that in which the carriage 101 of Figs. 16 and 17 is supported on these tubes 97.

The carriage 300 is provided with a means to detachably secure the same to tubes 97 so that the carriage can be longitudinally adjusted relative to the tubes 97 and then secured at any desired location. A means for securing the carriage 300 to the tubes 97 may include by way of example, U-shaped bracket portions 301 similar to the U-shaped portions 102 of Figs. 16 and 17 and a locking means 302 which has similar parts to the locking means shown in Fig. 17 and numbered 103 to 111 inclusive in Fig. 17.

The carriage 300 is provided with a plurality, preferably five, clamp brackets 303 mounted on the bosses 304. Preferably the heights of alternative bosses are varied as shown in Fig. 36. Stud bolts 305 are provided to secure the clamp brackets 303 to the bosses 304 to secure a clamping action within openings 306 in the brackets. The clamp brackets are angularly adjustable about the axes of the stud bolts 305 when the stud bolts are loosened. The openings 306 are preferably of square shape for the reception of L-shaped traction arms 307 of similar shape. The traction arms 307 are clamped in the brackets 303 by tightening stud bolts 305. Preferably the upper end portion of the upright member of each L-shaped traction arm 307 is round in cross section and carries a forked bracket means 308 which is adjustable on said upright. Each bracket means 308 has preferably two buckles 309 connected therewith in vertically spaced relation. A sling strap 310, a fragment of which is shown in Fig. 37 is adapted to be passed around the body of a patient and have its end portions connected with buckles 309. Thus each sling strap 310 will exert a lateral pressure on the body of a patient when the sling strap 310 is tightened in the buckles 309 or when the L-shaped traction arms 307 are moved laterally and stud bolts 305 are thereafter tightened. Figs. 35, 36, and 37 show a carriage 300 which provides for the use of five L-shaped traction arms 307. It is to be understood that I am not limited to the use of five L-shaped traction arms but I have found that such number is sufficient for practical purposes.

When it is desired to reduce or correct a simple or single lateral curvature, then one L-shaped traction arm 307 can extend to one side of the patient and two will extend to the other side. A sling strap, which is connected to the L-shaped traction arm that extends to one side, will engage substantially at the apex of the single curvature while the sling straps 310, which connect to the two L-shaped traction arms that extend to the other side, will be spaced apart a sufficient distance so that pressure and counterpressure can be provided to reduce the curvature and correct the alignment of the spine. In case of double curvatures then five L-shaped traction arms will be employed. The central traction arm and its sling will be utilized as a common member in reducing each of the curvatures and the outside two members at each end and the central member will function to reduce each curvature as a unit.

Thus in reducing a double lateral curvature of the spine, five arms 305 are used. Three alternate arms 307 will extend laterally in one direction from the carriage 300 and the other two arms 307 will extend laterally in the opposite direction. Thus traction or countertraction can be provided at the hump or apex on the convex side of any curvature and spaced therefrom will be two traction or countertraction means so that the hump or curve can be straightened out and the curvature of the spine reduced.

Alternately offsetting the vertical positions of the clamping brackets 303 reduces objectionable interference between the L-shaped traction arms 307 when individual arms 307 are turned at varying angles. Obviously the structure of Figs. 35 to 37 may be employed with the structure of Figs. 20 or 31, where technique requires. Obviously, this is also true of the various other parts and accessories illustrated throughout the drawings. As the techniques to be employed will depend upon the case involved and the judgment of the doctor no attempt has been or will be made to name all possible uses of the parts individually or collectively.

As indicated by the bone fragments 156 and 188 in Fig. 1 and parts connected therewith, my fracture machine may be employed where a skeletal fixation is employed. Also, as indicated in Fig. 23 it is possible to use foot plates and straps to provide traction without employing skeletal fixation.

When skeletal fixation is employed, then the various transfixion units heretofore used in the art may be employed. As an example I have shown in Fig. 1, a transfixion unit 179. This transfixion unit 179 may comprise half pins 311 which are inserted in a bone so as to form therebetween a V-shaped angle and the outer end portions of said half pins 311 are rigidly secured together by connecting or fixation rod 312 and clamp 313 (see Figs. 1, 3 and 8). As indicated in Fig. 3 the rod 312 is connected to the shaft 155 by means of a clamp 314.

In Fig. 1, I have shown the distal fragment 188 connected to transfixion units 201. These transfixion units 201 are shown, by way of illustration, as employing full pins. The through pins 315 are connected by clamps 313 (shown in Fig. 8) to fixation or connecting rods 316. Each fixation or connecting rod 316 is connected by the clamp means shown in Fig. 7 to a rod 317 and said rods 317 are connected by clamps 318 to the stub shaft 195. The operation of the traction unit has been previously described but some of the structural details of the transfixion units 179 and 201 were not described until this point in the interest of clarity. Also transfixion units and parts employed therewith are more completely described in connection with Figs. 56 to 66.

Referring to Fig. 2 of the drawings the tubular members 97 can be moved longitudinally relative the mounting block 89. Also, the tubular members 97 are open at their ends which are toward the left as considered from Fig. 2 of the drawings. Within said openings in tubes 97 may be inserted rods 319 (see Figs. 39 and 40) of a transfixion table supporting bracket. The transfixion table supporting bracket is provided with frame members 320 and each side frame member 320 is provided with a plurality of openings 321 and as shown in Fig. 40 such plurality of openings 321 comprises three openings. A transfixion table 322 is provided with three substantially centrally aligned shafts 323 and the medial one is threaded. Nut means 324 cooperate with the threaded shaft 323 to provide means to adjustably control the elevation of the transfixion table 322. The transfixion table shafts 323 telescopically fit in three openings 321 toward one side of the frame 320 or in the three openings toward the other side. In other words, as viewed in Figs. 39 and 40, the shafts 323 may go into the upper openings 321 or they may go into the lower openings 321 and the set of openings employed will depend upon the side of the patient being subjected to treatment. Also, said shafts 323 will interfit in openings 126, 128 and 130 of Fig. 16. The transfixion table 322 carries sleeves 325 which are utilized to telescopically receive shafts 326 of a transfixion table extension member 327. As the shafts 323 are removable from openings 321, the transfixion table 323 may be positioned so that the sleeves 325 are at the right as indicated in Fig. 39 of the drawings, or said sleeves 325 may be to the left as is indicated in Fig. 42 of the drawings.

In Figs. 41 to 46 of the drawings, I have indicated schematically various operative positions indicating some of the uses to which my fracture table and the accessories therefor may be employed. For example, in Fig. 41, I have shown an arrangement which may be employed where it is desired to place a body cast on a patient. Only portions of the machine and of the accessories are schematically illustrated. For example, transfixion table 322 is shown and is mounted on the holes 321 at the right (top as indicated in Fig. 41) of the frames 320. The frames 320 have been secured to the extension frame tubes 97 and a head table 100 is carried by the tubes 97 extending to the right as indicated in either Fig. 1 or in Fig. 41. The traction frames 134 and 135 are shown somewhat schematically and they have been turned to extend at right angles to the tubes 97. Thus a patient can have his head resting on table 100, the arms of the patient may be supported by suitable means connected to the traction frames 134 and 135 and the buttocks and legs of the patient will rest on the transfixion table 322. One suitable way of supporting the arms of the patient in the traction frames 134 and 135 is to connect the foot plate 298 shown in Fig. 23 and tie the wrists or hands, as may be desired, to said foot plates. This will function to support the shoulders of the patient so that a body or spica cast can be wrapped about the patient. The patient will be sufficiently above the tubes 97 so there will be no interference in wrapping the cast. Of course body casts can be wrapped about the patient in other positions, such as the position shown in Fig. 23 of the drawings and Fig. 20 of the drawings. However, at times it is desired to extend the arms of the patient at the time a body cast is applied and such may be accomplished in accordance with the schematic illustration of Fig. 41.

Referring to Fig. 42 an arrangement of parts is illustrated useful in performing a humerus transfixion or a reduction of a fracture in the upper arm. The arrangement illustrated will be for the left arm of the patient but it will be readily understood that the parts can be moved to readily accommodate for a right arm. In the showing in Fig. 42 of the drawings the head table 100 is in position. The transfixion table 322 has been supported by the frame 320 of Fig. 40 and the table 322 has been rotated in a horizonal plane 180° from that shown in Fig. 38. Thus the transfixion table extension 327 may be positioned as indicated in Fig. 42 of the drawings. In this position the traction unit 135 is preferably positioned at right angles and the traction unit 134 may be positioned at an angle of 45° to the axes of tubes 97 and inclined upwardly 45° to the horizontal plane of said tubes 97. This permits relaxation of the muscles and is illustrative of a transfixion of the upper arm. The traction unit 134 is schematically illustrated as containing transfixion means so that reduction of a fracture of the upper arm may be obtained in a manner similar to that illustrated in connection with Fig. 1 of the drawings and the socket joint at the shoulder of the patient will be aligned with the point X described in connection with Fig. 1 and associated views.

In Fig. 43 of the drawings I have illustrated a combination wherein there is a transfixion of a fracture in the lower or forearm. In this instance the elbow of the left arm will be positioned so that the ball joint of the elbow is aligned with the point X. For a tranfixion of a lower or forearm it is often desirable to maintain the traction frame which is being used, such as 134, in a position which is relatively near the tubes 97 and with the unit extending angularly to the horizontal at approximately 45°. Thus, in Fig. 43, the head of the patient will be on the head table 100, the left arm will be in the traction frame 134, the buttocks and legs of the patient will be supported by the transfixion table 322 and the right arm of the patient will either be permitted to be loose or, if desired, it can be supported by the traction frame 135 by tying the arms to a foot plate carried by such traction frame.

Referring to Fig. 44 of the drawings, I have indicated an arrangement of the parts which might be employed in connection with a thigh transfixion. The head of the patient will rest on head table 100, the sacrum of the patient may rest on the deck 227 of the sacral rest and the legs of the patient will be spread conveniently to permit the doctor to have plenty of room to perform the operation. In the event of a transfixion on a left leg, then the traction unit 134 will be provided with appropriate transfixion units and the right leg of the patient may be placed on a leg board 202. Even though no traction may be needed on the right leg of a patient, generally it is desired to employ the foot plate 298 shown in detail in Fig. 23 and shown schematically in Fig. 44 so that there will be no danger of the right leg of a patient being accidentally removed from the leg board 202. In Fig. 44 as in other instances where there is a transfixion of a fractured limb, the ball joint or the center of articulation of the limb involved in the superior fragment will be aligned with the point X.

In Fig. 45 I have shown an illustration of the parts which may be employed where there is a transfixion of a fracture of a lower leg or a tibia transfixion. In such instance the point of articulation of the superior fragment of such limb will be aligned with the point X. The body of the patient will be supported from the transfixion table 322 and the left leg will be in the traction unit 134 and the right leg will be supported by a leg board 202.

Referring to Fig. 46 of the drawings, an illustration is shown wherein there is a transfixion of an ankle of a patient. It is illustrated as being applicable to the left ankle of a patient and the traction unit 134 will support the left leg of a patient and the articulated joint of the superior fragment will again be aligned with the point X. The body of the patient will rest on transfixion table 322, the head of the patient will rest on the transfixion table extension 327 and the right leg of the patient will rest on the leg board 202. It is to be noted that in Fig. 46 the transfixion table 322 and the transfixion table extension 327 are in the same position as shown in Figs. 38 and 39 of the drawings, while in Fig. 42 of the drawings, the position of the transfixion table 322 has been rotated 180°.

It is to be understood that the various illustrations in Figs. 41 to 46 of the drawings are not limitations and are obviously not all of the various uses of my fracture table nor of the accessories shown in said figures. They are in part shown to illustrate the uses of the head table 100, the transfixion table 322, and the transfixion table extension member 327. Also theses views are of importance in indicating that regardless of the nature of the transfixion or operation that the center of articulation of, or ball socket joint of, the superior fragment of a bone can always be aligned with the point X and the patient supported.

While I have shown a transfixion table 322 and extension member 327, it is to be noted that I can use the lumbar support as a transfixion table and can provide an extension therefor of suitable size.

In various figures the leg board 202 has been used as the means for supporting either a well leg or a leg which did not require traction thereon. An alternative way of supporting such a leg, either at the calf or the upper portion of the leg, is also illustrated in Fig. 2 of the drawings. Obviously, if a leg board is employed to support the calf and thigh of a leg the additional or alternative means will not be employed, but in the interest of brevity both are shown on the right side of the fracture machine of Fig. 2. This alternative means of supporting the calf and the thigh of a leg comprises a calf or thigh support 328 which is pivotally mounted on a bracket member 329. The bracket 329 is slidably adjustably mounted in blocks 330 and the blocks 330 are pivotally and removably supported on removable tubular members 138 and 139. As the means for adjusting and locking the calf and thigh supports may be that specifically described in connection with Figs. 56 to 66, they are only generally illustrated in connection with Fig. 2.

The tubes 97 and bracket 98 connected therewith are highly useful in my invention and they function as the mounting means for various accessories which are useful in orthopedic surgery. For example, I have shown that said tubes 97 and bracket 98 mount the lumbar support 99; the head table 100; the transfixion tabe 322; indirectly the transfixion table extension 327; the shoulder rest 244; the neck rest 269; the head rest 286; the head rest which has the cushion member 288 engaging the face of a patient; the head traction means which include, among others, members 293, 294, and 295; and the lateral traction arms 307 which are employed in connection with spinal curvature corrections. Also, the tubes 97 and bracket 98 function in combination with the sacral rest and such combination, or the sacral rest alone, functions to mount various accessories as the overhead supporting means shown in Figs. 31 and 32; the back arching members 277; and the spine supporting member 272.

The traction frames 134 and 135 comprise spaced apart tubes which can be moved as a unit horizontally or vertically about a common point X and will move any limb therein, which has its center of articulation located at the point X, about its center of articulation. Also, means are carried by the traction frame so that any superior fragment so located can be rotated, and angularly moved in horizontal and vertical planes about such point X. Also, the traction frames carry traction units which carry the distal fragment of a bone and provide for angular movement in vertical and horizontal planes, for rotary movement, and traction about a common point which has a predetermined relation to the superior fragment. Also, the tubes of the traction frames support the bone fragment in a position intermediate thereof and permit ease of applying a cast and permit the use of X-ray machines at any desired location throughout the length of the bone involved. Also, the traction frames support leg boards or calf and thigh supports.

As has been indicated in connection with the various figures, the device of the foregoing figures can be employed for the reduction of fractures of various bones of the body and is not limited to the reduction of a fracture of any particular bone. Also, it is to be noted that a fracture at different locations in the same bone involves different technique in reducing the fracture but again it is important that regardless of the bone involved in the fracture or the location of the fracture in a particular bone, still reduction of the fracture can be made by employing the device just described. Also, this machine can be used in other orthopedic work other than fractures and is useful as an operating table for general surgery.

As an example of a bone fracture which is difficult to reduce and which I have found can be reduced by employing my fracture machine more easily than was heretofore possible, reference is made to Fig. 47 of the drawings. In Fig. 47 of the drawings there is illustrated a fracture of a femur and the fracture is relatively close to the upper joint of the femur. Also is illustrated in said Fig. 47 some of the muscles which are present in a normal human leg. The muscle group which is designated as 331 are attached to the superior fragment and are not attached to the distal fragment and cause the superior fragment to swing out in abduction while the muscle group marked 332 extend to and attach to the lesser trocanter and cause the fragment to be turned in an upward direction. The muscle groups 331 and 332 have no substantial influence on the position of the lower or distal fragment. What causes a shortening or overlapping of the superior and distal fragments is the force represented by the contraction of the muscles in the muscle group designated as 333. The muscles in group 333 have their origin in the pelvis and their insertion in the lower fragment or into the tibia below the knee. The muscle group marked 334 arise from attachment in the lower fragment and then proceed through the knee cap down to the tibia. The group of muscles back of the knee arise in the distal part of the thigh bone and insert into the tibia or leg bone or into the heel causing the knee to be forced into flexion with fractures just about the knee point level. There are few or insignificant number of muscles which arise in the upper fragment and enter into the lower fragment where the break is substantially of the location shown in Fig. 47 of the drawings.

Thus if a fracture of the nature indicated in Fig. 47 of the drawings is to be reduced, the patient can be positioned on the table so that the center of articulation of the superior fragment will be positioned at the point X as considered in connection with Figs. 1, 2 and 3 of the drawings. Next, the superior fragment, which is numbered 156 in Fig. 1, can be adjusted to counteract angular displacement in horizontal or vertical planes and also the fragment may be rotated to correct for rational displacement. If sufficient angular correction of the superior fragment cannot be obtained or if the technique does not call for complete correction, then the tractor unit 134 may be angularly moved in vertical and horizontal planes so the distal fragment can be aligned with the partially corrected superior fragment. Also, the unit 134 can be aligned after traction has been applied, if desired, without changing the traction. Thereafter the fragment can be locked in the desired aligned position. After the superior fragment has been thus positioned, then if a break is one of the character indicated in Fig. 47 of the drawings, traction can be applied by the nut 189 and at the same time the distal fragment can be angularly moved in a horizontal or a vertical plane to correct for the displacement caused by the uneven pull of the various muscles involved. It is very important in my invention to note that while the distal fragment is being manipulated that any correction whether it is in a horizontal plane or in a vertical plane or whether it is a rotational correction that any correction made may be sustained and locked and movements in all other directions are free. Thus, for example, if the fracture is at a location so that muscles and so forth are tending to pull the distal fragment angularly in a horizontal plane, then the displacement caused by such pull can be corrected and held and the distal fragment may be permitted to rotate or angularly move in a vertical plane to provide reduction of the fracture. Similarly, if the forces involved tend to displace the distal fragment in a horizontal plane, then as traction is applied, the necessary angular horizontal correction can be made and locked and then the bone will self-align to reduce the fracture. If there are forces tending to misalign the distal fragment angularly in both horizontal and vertical planes, then both corrections can be made and the corrections held and then upon the applying of traction, the bone will be allowed to rotate and again we have self-alignment of a fracture during reduction. It is important to note that a force causing displacement, whether angularly in a horizontal or vertical plane or rotative, can be counteracted to the extent desired, and such conditions maintained while all other movements are free during reduction.

Referring to Figs. 48 to 50, I have shown a self-aligning fracture splint which embodies features of my fracture table which has just been described. Primarily the device of Figs. 48 to 50 is used where a lighter and more portable device is desired and which need not serve all of the various functions of the structure of Figs. 1 to 47 inclusive. In said Figs. 48 to 50 inclusive, a suitable base or supporting means is employed and said base and its associated parts may comprise a threaded post 335 which is secured to the hub portion 336 of a bracket arm 337 and the post 335 extends downwardly from the bracket arm 337 through a nut 338 and through a sleeve 339 into a tubular post 340. The nut 338 rests on the top of sleeve 339. The sleeve 339 has a longitudinal slot 341 and the upper end portion of the post 340 is correspondingly slotted and a hand screw 342 engages the sleeve 339 on one side of the slot 341 and threadedly engages the opposite side of the sleeve 339 and thus upon tightening of the hand screw 342 the portions of the sleeve 339 on opposite sides of the slot 341 and the portions of the posts 340 on the opposite sides of said slot 341 are urged relatively toward each other and thus the sleeve 339, the post 340, and the threaded post 335 may be securely clamped together or upon loosening of the hand screw 342 the threaded post 335 may turn relative to the post 340. Thus the hand screw 342 permits relative movement between the bracket 337 and parts connected therewith and the post 340 and the base member connected with said post 340. Also the nut 338 permits relative adjustment as to the vertical height of the bracket arm 337 and parts connected therewith. Preferably the lower end portion of the tubular post 340 fits into a socket 343. A means for preventing movement between the post 340 and the socket 343 may comprise a pin 344 rigid with the post 340 and which pin 344 seats in a notch in the top edge portion of the socket 343. The pin 344 thus prevents relative rotation between the socket 343 and the post 340 and permits sliding telescopic movement between the parts so that they are readily detachable when desired.

The socket 343 is integral with a cross support 345 and the cross support is preferably provided with two leg members 346 which have suitable means thereon to rest on the floor. The cross support 345 carries additional leg members 347 each of which is preferably angularly movable between the full and the dot and dash line positions shown in Fig. 50. This may be accomplished by connecting leg members 347 with the cross support 345 by means of bolts 348 which function as pivot means.

Ordinarily the structure of Figs. 48 to 50 is used in combination with an operating table or some similar support. Thus it is desirable that the spread between legs 347 or between legs 346 be sufficient so that the legs at the end of an operating table will readily fit between the legs 346 or the legs 347. Normally if the transfixion involves a tibia or a lower bone in the patient, then the structure of Figs. 48 to 50 will be placed at the foot of the operating table or the table to support the torso of a patient and the member 349 will function as a sacral rest. However, if the fracture to be reduced is in the arm of a patient, then the device normally will be placed alongside of an operating table or similar structure. When the device is placed alongside of an operating table, obviously the weight of a patient will be substantially carried by the operating table and less stability will be required of the structure. Under such circumstances the device can be placed closer to the operating table by swinging the legs 347 in a direction from their full line position in Fig. 50 toward or to their dotted line position in said figure.

The hub portion 336 is rigid with the threaded post 335 and thus the angular position of the hub portion 336 is determined by the angular position of the threaded post 335. The angular position of the post 335 can be adjusted and locked by hand screw 342 and thus the post 335 and parts carried thereby can be angularly adjusted relative to the base 345—346—347. The bracket arm 337 is pivotally secured to another bracket arm 350 by pivot means 351. The axis of rotation of bracket 350 relative to bracket 337 passes through the point X which point X is in all respects similar to the point X described in connection with the device of Figs. 1 to 47, which is best shown in Figs. 1, 2, and 3 thereof. In order to provide for adjusted angular movement of the bracket arm 350 as respects the bracket arm 337 and to lock the bracket arm 350 to any adjusted position, I provide a hand operated locking screw 352, which is threaded into the arm 350 and passes through the arcuate slot 353 in the arm 337 (see Fig. 48). Thus if a limb is supported from bracket arm 350 with its center of articulation coinciding with the point X, any up and down movement or angular movement in a vertical plane of the bracket arm 350 and any limb connected therewith having its center of articulation at the point X, will provide for angular movement of the limb in a vertical plane and about the center of articulation of the superior end thereof. Thus the correction provided by reason of angular movement of the bracket arms 350 of Figs. 48 to 50 will be the same correction as is provided in Figs. 1, 2, and 3 when the traction unit is moved by reason of arcuate racks 141 or 157 and means connected therewith.

An arm 354 is secured to the bracket arm 337 by any suitable means, such as a pin 355, which is rigid with arm 354 and interfits in a suitable recess in the hub 336. Also, a locking screw 356 preferably passes through arm 354 and threadedly engages the hub 336. The threaded shaft 357 is preferably slidably mounted in a recess in the arm 354 and vertical adjustment of the threaded shaft 357 is accomplished by means of a nut 358 threaded on shaft 357 and positioned to directly rest on arm 354, or as shown in Fig. 49 to have a bracket member 359 interposed therebetween. The bracket member 359 is preferably provided with a slot 360, which slot may receive any suitable rod to mount thereon accessories such as a leg support for a leg or a support to better hold the head of the patient on the operating table. In Figs. 57 and 59 herein where I have shown a still further modified form of the invention, I have shown a somewhat similar construction where a leg rest protrudes from an accessory bracket which may be similar to the bracket member 359 and slot 360. The upper portions of threaded shaft 357 supports a sacral rest 349 and thus vertical adjustment of the sacral rest 349 may be accomplished by rotation of nut 358. Also, when desired the threaded shaft 357 and a sacral rest supported thereby may be readily removed and detached from the arm 354.

Tubular members 361 are interconnected at their ends toward the head of a patient by a bracket 362. The bracket 362 is mounted for horizontal angular adjustment relative to the bracket arm 350 by means of a hand operated locking screw 363 which is slidingly mounted in bracket arm 350 and threadedly engages the bracket 362. The bracket 362 is preferably provided with a boss-like portion 364 and such boss-like portion 364 is pivotally connected with an arm 365. The swinging movement of a limb, similar to the movement about 149 of the previous structure of Figs. 1 to 47 and as best shown in Figs. 1 to 3, obtains about the axis of pivot member 363 which axis intersects point X. If locking screw 363 is loosened, then the bracket 362 and traction frame connected therewith can be angularly moved in a horizontal plane similar to the movement of yoke 140 and the traction frame 134 or 135 connected therewith and similar functions obtain.

In order to provide for independent angular adjustment of the arm 365, said arm 365 is mounted on pivot means 366. The axis of said pivot means 366 passes through the point X and thus any bone supported by means carried by arm 365 and which bone has its center of articulation at X will have its center of angular movement in a horizontal plane through X. Again if the center of articulation of the upper end of a superior fragment is aligned with the point X, then it is possible to angularly move an arm 365 connected with said bone in a horizontal plane about pivot 366 and all such movement will be about the center of articulation of the superior fragment. Also, in order to provide for holding any adjusted angular position of the arm 365, there is provided a locking screw 367 which passes through an arcuate slot 368 in the arm 365 and which locking screw 367 threadedly engages the boss-like portion 364 of the bracket 362.

The fracture splint of Figs. 48 to 50 may be employed in connection with operation on either the right side or the left side of a patient. In the position the parts are shown in Figs. 48 and 49, the legs of a patient will extend in the same direction as the tubular members 361 extend and operations may be performed on the left side of a patient. If the threaded shaft 357 and parts connected therewith are removed and the locking screw 363 is loosened and locking screw 367 is loosened, then the bracket 362, tubular members 361 and parts connected therewith can be angularly moved in a horizontal plane substantially 180°. At the same time the bracket arms 350 and 337 and arm 365 can be maintained relatively stationary. Thereafter the locking screws 367 and 363 can be tightened and the threaded shaft 357 may be reinserted in the opening in arm 354. A patient will be placed on the operating table with his feet projecting in the opposite direction and in the direction of projection of the tubular members 361. Thus the patient and the device will be positioned so that operations can be performed on the right side of the patient. From the foregoing it is obvious that the device can be readily employed on either side of an operating table or on either end of an operating table and that operations can be performed on either side of a patient.

As the following parts are functionally identical with parts of Figs. 1, 2, and 3 and shown in detail in Figs. 10, 11, and 12, the showing in Figs. 48 and 49 are not complete as to all details and the parts which are shown are given similar numbers to those in said previously mentioned figures. The parts which are shown in Figs. 48 and 50 are: lever 178, shaft 155, sleeve member 172, locking screw 176, clamping screw 168, thumb screw 166, housing member 163, block 174, arcuate racks 162, and transfixion unit 179. In Fig. 48 of the drawings a femur is shown in operative position in the device but such femur is not shown in Fig. 49 in the interest of clarity of drawings. As the femur may be the same as that involved in Fig. 1, the superior fragment of the femur connected to transfixion unit 179 is given the same number, namely, 156. Thus upon turning of lever 178, a bone having the center of articulation aligned with X can be angularly moved in a vertical plane and about its center of articulation by lever 178. Also, such a bone can be rotated about its center of articulation by turning of member 166 which moves housing 163 on arcuate racks 162.

The tubular members 361 are identical in function to the tubular members 136 and 137 of Figs. 1 to 3. These tubular members 361 carry removable tubular members 369 and 370 which are functionally the same as removable tubular members 138 and 139 respectively of Figs. 1 to 3. Other parts which are functionally the same as parts of Figs. 1 to 3 are split sleeve 371 corresponding to split sleeve 203, locking screw 372 corresponding to locking screw 204, bracket 373 corresponding to bracket 180, and calf support 374 corresponding to calf or thigh support 328. The following named parts in Fig. 48 are identical in function to parts described in connection with Figs. 1 to 3 inclusive and for such reasons they are given similar numbers. The parts involved are: threaded shaft 183, traction nut 189, locking screw 187, pivot 191, plate 190, bracket 192, locking screw 193, stub shafts 195, yoke 196, bracket 197, clamp 198, locking screw 199, shaft 200, clamp 318, rods 317, and fixation or connecting rod 316. In order to illustrate that the rods 317 and fixation rods 316 may carry half pins rather than through pins I have illustrated in Fig. 48 half pins 375 which are connected to the distal fragment 188. The distal fragment 188 is given the same number as it was given in connection with Figs. 1 to 3. From the foregoing it will be apparent that the mode of operation of the structure of Figs. 48 to 50 may be identical with the operation of similar structure indicated in Figs. 1 to 47 inclusive and particularly as respects manipulation of both the superior and distal fragments.

At times it is desirable to provide for positive movement of bone fragments toward each other as distinguished from traction or movement away from each other. Therefore I have illustrated in connection with Fig. 48 a nut means 376 which threadedly engages threaded shaft 183 and obviously by turning the nut 376 in the proper direction, the shaft 183 and members connected therewith can be urged in a direction so that the distal fragment 188 is positively urged toward the superior fragment 156. Thus while I have indicated said nut 376 only in connection with Fig. 48 of the drawings it is to be remembered that the same is employed in connection with the threaded shaft 183 where desired and thus obviously said retraction nut 375 is useful in the various forms of my invention including inter alia the forms shown in Figs. 48 to 50 inclusive. Obviously traction nut 189 and nut 375 must be conjointly operated to prevent locking thereof.

The modification of my invention which is illustrated in Figs. 51 to 55 inclusive, is one where the mechanism has been reduced in number of parts and functions to provide portable apparatus of minimum weight so the same can be used away from more completely equipped surgeries or the like, and for such reason I have termed the same a "bedside" splint. This embodiment of my invention comprises a hollow member 377 which preferably is in section of a shape so that clamp means can be readily positioned thereon and provision is thus made to prevent relative turning of the clamp means and the member 377. Thus a very suitable shape will be square in section. The hollow member 377 telescopically receives a second member 378. The second member 378 is of a section so that the same will be telescopically received by the hollow member 377 and relative turning between the two members is prevented. As means to provide for longitudinal extension or contraction of the overall length of members 377 and 378, I have illustrated in Fig. 55 a threaded screw 379 which has a head portion 380. A means to mount the threaded screw 379 for rotative movement relative to the member 377 and yet prevent relative longitudinal movement between 379 and 377 may comprise a collar 381 carried by the screw 379 and keyed thereto to prevent relative movement between the parts. A block 382, which rotatively mounts screw 379, is fixedly secured to the member 377. The threaded portion of the screw 379 threadedly engages the member 378 and thus upon rotation of the head member 380 by engagement thereof with a suitable tool the relative overall length of the members 377 and 378 can be controlled as desired.

The clamp 383 secures the arm 384 to the member 377. By loosening the clamp 383, the arm 384 and parts connected therewith can either be positioned as indicated in Fig. 51 of the drawings or the same can be positioned 180° from such position. When the arm 384 is in the position shown in Fig. 51 of the drawings, and the arm 385 is also in the position shown in Fig. 51 of the drawings, the parts of the apparatus will be arranged so that the apparatus can be employed in connection with operations on the left side of a patient's body. In the event that the arm 384 is removed and replaced in a position 180° from that shown in Fig. 51 and the arm 385 is turned in a manner which will be hereinafter described, then the parts are positioned to be used for operations on the right side of a patient's body. The arm 384 is secured by pivot means 386 with another arm 387. In order to provide locking means so that any angular adjustment of the arm 387 relative the arm 384 may be locked when desired, I provide a locking screw 388 which passes through an arcuate slot 389 in the arm 387 and the locking screw 388 threadedly engages the arm 384. As the arm 387, by means hereafter described, carries the superior fragment of a bone then any angular movement of the superior fragment of a bone, which has its center of articulation coinciding with the point Z, will be in a horizontal plane on the axis of rotation of the pivot means 386. Thus if the superior fragment is axially aligned relative to the axis of the pivot means 386, then movement of the arm 387 and any bone secured thereto and so located will be a movement in a horizontal plane about the axis of articulation of the superior fragment. I have indicated such axis of rotation in Fig. 51 by the dot and dash lines marked 390. The arm 387 carries a track bar 391 which is preferably positioned at an angle of 45°. The track bar 391 slidably supports a clamp 392, which slidably engages a rod 393. The rod 393 preferably carries a plurality of clamping means 394 which secure a connecting or transfixion rod 395 (similar to rod 312 of Fig. 1) which in turn is clamped by clamp 396 to half pins 397.

By adjustment of the clamping means 394 and by adjusting clamp 392 relative the track bar 391 and by sliding the rod 393 longitudinally of its length, the structure can be arranged so that the axis of rotation of the rod 393 coincides with the center of articulation of a superior bone fragment 156 having its center of articulation at point Z. Thus if the rod 393 is rotated about its axis by means of hand lever 398, the superior fragment can be angularly moved in a vertical plane and the angular movement of the bone fragment will be about an axis numbered 399 which is an axis of articulation of the superior bone fragment 156 and at the same time is the axis of rotation of the rod 393 and the means which function to angularly move the bone in a vertical plane. It is to be noted that line 399 which is a dot and dash line intersects the line 390 at the point Z and thus angular movement of the superior fragment in a vertical plane or in a horizontal plane will be about an axis which is the center of articulation of the superior bone fragment 156.

In Fig. 51 of the drawings, the superior fragment may be manipulated by the mechanical means shown either angularly in a horizontal plane or angularly in a vertical plane and in each instance about the center of articulation of the superior fragment. However, in the structure of Fig. 51, I have not indicated means to rotate the superior fragment about its axis. This movement is accomplished by the gear and rack mechanism carried by the arm 158 of Fig. 3 or by the gear and rack mechanism carried by the arm 365 of Fig. 48. Also, in the previous figures provision was made to vertically raise or lower and to horizontally swing the limb carried by the traction unit as distinguished from manipulating one fragment of a bone. The purpose of raising or lowering the entire limb and swinging the same horizontally about the center of articulation of the superior fragment has been heretofore given. In connection with the structure of Fig. 51, these functions can be partially accomplished by manual manipulation and the manipulation can be often retained by sand bags or the like.

In Fig. 51 I have shown a plurality of clamps, which I have numbered 394 to connect the rod 395 with the rod 393. In view of the fact that I have not provided for rotary movement of the superior fragment 156 by mechanical means, it is desirable that a plurality of clamps 394 be used, all of which have their axes of rotation at different angles so that it is possible to connect all the parts as indicated in Fig. 51 and with the securing screws and nuts loose. Thereafter by hand manipulation rotation of the superior fragment to a sufficient degree can usually be obtained and thereafter the various screws and nuts of the clamps are tightened with the superior fragment held by hand grasping the rod 395. While I prefer to have all of the five movements which have been illustrated in connection with the previous embodiments of my invention, yet where circumstances require the use of the splint of Fig. 51 I have found that the same is very satisfactory.

The end portion of the member 378 shown at the left in Fig. 51 is secured to the plate member 400. The arm 385 is positioned against a face of the plate member 400 and is adjustably secured to said plate by a bolt 401 that passes through a longitudinal slot 402 in the arm 385 and is threaded into the plate 400. The arm 385 carries a pin 403 and the plate member 400 is provided with two notched portions 404 and 405 which extend upwardly and outwardly and at an angle of substantially 90° to each other. Thus the bolt 401 may be loosened and the arm 385 extended to the left as viewed in Fig. 54 of the drawings or to the right and the pin 403 may be inserted in a selected notch and then the bolt 401 is tightened to secure the parts in such relation. In the event that the left side of the patient is involved, then the arm 305 will be extended in the direction shown in Fig. 54 of the drawings and if the right side of a patient is involved, then the arm 385 will be turned to the right and the pins 403 will be positioned in one of the notches of the notched portion 405. The notch of the notched portion 404 or 405 which will be engaged by a pin 403 will depend upon the size of the person being treated. In other words the splint and the patient are so relatively aligned so that the center of articulation of the superior fragment will align with point Z. For example, if an adult is involved the distance between the skin area of the buttocks of such an adult person to the center of articulation of the superior fragment will be greater than the distance involved between the same parts if an adolescent or a child is involved. In other words, the distance along line 390 to the point Z will vary. At the same time the distance between the line 390 and the member 377 will not substantially vary as this will be taken up by adjustment of the clamps 394 and of the rod 393. In order to keep both ends of the splint substantially aligned the notched portions 404 and 405, pin 403 and adjustable arm 385 are provided. Traction is applied, by means hereinafter discussed, along the anatomical axis of the bone involved. Thus the pin 403 is moved outwardly in the notches in a notched portion 404 or 405, the effective length of the arm 385 will be changed and provision will be made to substantially compensate for the varying height of the point Z along the line 390. The simplified structure of Fig. 51, which has been reduced in parts in the interest of lightness and portability, has been found sufficiently accurate for the uses intended.

The arm 385 slidably receives a shaft 406 and said shaft 406 is locked when desired to the arm 385 by locking screw 407. The shaft 406 is mounted for rotary movement in the arm 385 and displacement of the shaft 406 from the arm 385 in response to traction by the traction means, which will be described, is prevented by reason of collar 408 which is secured to shaft 406 as by pin means. Whenever it is desired to lock the distal fragment against rotation, which results from locking shaft 406 against rotation, this is accomplished by tightening locking screw 407. The shaft 406 rigidly carries a plate 409 and the plate 409 may be similar in construction and operation to the plate 190 of the previous figures. The plate 409 is pivotally mounted on pivot 410 which pivot 410 is similar to pivot 191 of the previous figures. The plate 409 is movable between the arms of bracket 411 which bracket 411 may be similar in construction to the bracket 192. Locking screw 412 functions similar to locking screw 193 to prevent relative movement between the bracket 411 and the plate 409. The stub shafts 413 are similar in function to the stub shafts 195. The stub shafts 413 carry yoke 414 in a fashion similar to that in which the stub shafts carried yoke 196. Bracket 415 is similar in function as bracket 197 and supports clamp 416 in a fashion similar to that in which bracket 197 supported clamp 198. Locking screw 417 rigidly secures shaft 418 to bracket 415 in a manner similar to that in which locking screw 199 secured shaft 200 to bracket 197. Clamps 419 secure rods 420 with yoke 414 and rods 420 are each secured to a fixation rod 316. Thus clamps 419 and rods 420 function similarly to clamps 318 and rods 317 except that the rods 420 are L-shaped and further the rods 420 are connected with stub shafts 413 by way of yoke 414 instead of connecting directly with said stub shafts. A fixation rod 316 is shown connected with the half pin 375 in a manner similar to that described in connection with Fig. 48 of the drawings and therefore such parts are given similar numbers.

In the structure of Fig. 51 the distal fragment is connected by a plurality of substantially rigid means to the stub shafts 413 and therefore any movement of the distal fragment about the stub shafts 413, and the axis of rotation, will be similar to the mode of operation described in connection with the previous figures. This movement will take care of angular correction of the distal fragment in a vertical plane. The axis of stub shafts 413 intersects with the axis of the pivot 410 and any angular movement of the distal fragment 188 in a horizontal plane will be about an axis which has as its center the pivot means 410. Also any rotary correction of the distal fragment 188 will be about the center of the shaft 406 and these three centers of rotation coincide and are aligned with the anatomical axis of the bone which is being subjected to treatment. In order to provide traction on the distal fragment I have found that the alternate structure, shown in Figs. 51 to 55 and which involves moving the members 377 and 378 relatively away from each other, is suitable and such is accomplished by rotation of head member 380 and in turn threaded screw 379. As the structure of Figs. 51 to 55 is often used at a bedside or at places offering similar accommodations, it is highly useful to have the parts of the shape shown to provide minimum mass, maximum strength, and non-interference between parts.

The alternative form of my invention illustrated in Figs. 56 to 66 is the same as that illustrated in my copending application Serial Number 499,647, now abandoned, of which this application is a continuation-in-part. Further said form of my invention illustrated in Figs. 56 to 66 inclusive is similar to the form of my invention illustrated in Figs. 48 to 50. In the interest of continuity, the description of Figs. 56 to 66 inclusive will substantially follow the description of said figures as was given in my said copending application Serial No. 499,647.

This form of my invention comprises a horizontal, spider-like base member 421, formed with a socket 422 in which the lower end of a vertical, tubular standard 423, is removably fixed. Telescopically fitted in the standard 423 to serve as an upper end extension thereof, is a post 424, and this is adapted to be rigidly fixed in the standard at any of its different positions of extension, by a set screw 425 that is threaded through a collar 426 on the upper end of the standard and may be tightened against the extension post 424. The set screw 425 as here shown, is equipped with a turning handle 427 that for convenience in use is hinged to the screw head.

Fixed on the upper end of the post 424 is a fitting 428 and mounted thereby is a frame supporting cross bar 429. The fitting 428 and the cross bar 429 are formed, respectively, with complemental members 430 and 431 of a clamp connection; these members having flat, preferably knurled surfaces disposed in face to face contact. A clamp bolt 432 is rotatably contained in a central, horizontal bore in the member 430 and is threaded centrally into the member 431 as seen in Fig. 60. The clamp bolt 432, as here shown, extends in the direction of the cross bar 429 and may be loosened to permit lateral swinging of the cross bar 429 for upward or downward tilting of the frame that is supported thereby, as will presently be explained. Bolt 432 has a handle 433 for tightening it, thus to retain any adjustment of the frame that is made.

The cross bar 429 extends equally to opposite sides of the axis of a supporting standard 423 and is formed at its opposite ends with lateral opening sockets 434 and 435, as shown in Fig. 59, in which the ends of horizontal rods 436 and 437 are fixed. These rods extend horizontally, in parallel relationship and overlie the supporting base frame 421. Supported by this pair of rods 436 and 437 is the adjustable frame which mounts the traction applying means and the transfixion unit for the distal fragment. The traction frame, as seen in Figs. 57 and 59, comprises tubular sleeves 438 and 439 that are telescopically fitted into and movable on rods 436 and 437, respectively. These sleeves 438 and 439 are connected across their outer ends by an upwardly arched yoke 440. At their inner ends, each sleeve 438 or 439 has a collar 441 thereon through which a set screw 442 is threaded and adapted to be tightened against the corresponding mounting rod to hold any adjustment of the frame along the rods.

The yoke 440 is formed at its central or top portion with a bearing 443 axially coinciding with the longitudinal, central plane of the frame, and intersecting the extended axis of post 424. A sleeve 444 is rotatably fitted in the bearing 443 and this sleeve contains a threaded shaft 445 therein; the shaft being keyed in the sleeve and longitudinally slidable therein. A set screw 446 is threaded into the bearing 443 and may be tightened against the sleeve to hold it against turning in the bearing.

At its inner end the shaft 445 mounts a clamp block 447, in which a cross rod 448 is held. The cross rod 448 mounts means for the adjustable mounting of the skeletal transfixions for the securement of the distal fragment, as presently explained in connection with Figs. 64 and 66.

The block 447, as shown in Fig. 64, is pivotally fixed to the flattened inner end portion of the shaft 445 by a pivot bolt 449 which may be tightened to hold the block and shaft relatively rigid. Likewise, rod 448 is longitudinally movable and is rotatable in the block 447, but will be held fixed therein against rotation or endwise movement upon tightening the clamp bolt 450. It is through endwise adjustment of the shaft 445 in its supporting bearing 443 that traction is applied through the parts carried by the block 447.

Threaded onto the outer end portion of the shaft 445 and seated for rotation against the outer end of the sleeve 444 is a wing nut 451 which may be manually turned for the purpose of drawing the shaft outwardly, thus to effect the application of tractive force to the fracture fragment with which it is attached. It is to be understood that when the set screw 446 is loosened, the shaft 445 can be rotatably adjusted. This may be manually done to correct rotational displacement of the fragment, or may be automatically accomplished by muscle reaction incident to applying traction for reduction.

After rotational correction of the fragment has been made, the parts may be locked against rotation by tightening set screw 446 against the sleeve 444 in which the shaft 445 is keyed for longitudinal travel.

Referring now to the countertraction members: Mounted centrally upon the cross bar 429 is a laterally directed horizontal arm 452, best shown in Figs. 59 and 60. This arm is pivotally fixed in position by a pivot stud 453 that extends through the inner end of the arm and into the cross bar 429 and in the axial line of post 424. Formed in the mounting end of the arm, concentrically about the pivot center, is an arcuate slot 454, and extended through this slot and threaded into the cross bar 429, is a bolt 455 that may be tightened against the arm, thus to hold it at any of its various positions of angular adjustment on the mounting pivot. The arm 452 is initially set to extend in a lateral direction, perpendicular to the longitudinal line of the frame, as will be understood best by reference to Figs. 59 and 60, and the pivotal movement provided for is to permit correction of any lateral angulation of the superior fragment.

Fixed to the outer end of arm 452 and extending upwardly, are two spaced, parallel rack bars 456, arcuately curved about the point of intersection of the extended axial line of the shaft 445 and the extended axis of the post 424. At their upper ends, the rack bars are joined by a cap or block 457.

Slidably movable along the rack bars 456, is a block 458, provided with channel-like guideways 459 and 460, see Figs. 62 and 63, in which the bars 456 are contained. Adjustment of the block 458 longitudinally along the bars is effected by rotation of a horizontal, cross shaft 461 that is mounted rotatably in the block, and on which shaft, gear pinions 462 are fixed in operative mesh with the teeth of the rack bars. On one end of the shaft 461 is a hand wheel 463 whereby it may be rotated to rotate the gears and thus effect an adjustment of the block in an up or down direction along the bars 456. These gears retain the adjustment of the block due to the frictional tightness of the shaft and turning handle.

The block 458 has a central body opening 464, and in this opening a bearing block 465 is located, as best shown in Fig. 61. The block 465 is mounted by the cross shaft 461 which extends through its lower portion and is adapted to be rocked pivotally thereon. Rotatably contained in the block 465 is a guide sleeve 466, coaxial of which a square rod 467 is contained for endwise movement. The rod 467 extends at its ends well beyond the block 458 as noted in Fig. 60, and is substantially horizontally disposed and lies in the vertical, longitudinal plane of the arm 452.

With the rod 467 so mounted in the block and sleeve, it may be adjusted in an endwise direction toward or from the central longitudinal plane of the splint. Also, it may be axially rotated and it may be tilted up or down about the block supporting shaft 461. When an endwise adjustment of the rod 467 has been made, it may be held in that adjustment by tightening thereagainst of a set screw 468 that is threaded through the outer end of the sleeve 466. Any rotational adjustment of the rod may be held by tightening a clamp screw 469 against the sleeve; this screw being threaded through a side of block 465 to engage against the sleeve as seen in Figs. 62 and 63. Up and down tilting adjustment of the rod 467 is possible by reason of the pivotal action of the block 465 on the cross shaft 461. Such adjustment may be retained by tightening a cross bolt 470 which extends through the upper portion of block 458 and passes through an arcuate slot 471 in block 465; this slot being formed arcuately about the shaft 461 as a center. As seen in Fig. 63, the bolt extends freely through extending flanges 472. Mounted on the bolt 470 and overlying the rack bars, are guide shoes 473. The bolt extends freely through the shoe against which the head of the bolt engages, and it is threaded into the shoe at the side of the block. When the bolt 470 is tightened, it causes the shoes 473 to be clamped tightly against the flanges 472 through which the bolt 470 is extended, and springs these flanges against the sides of the block 465 to hold the latter against pivotal movement on the shaft 461.

With this arrangement, the applying of traction is through shaft 445 and the countertraction is sustained by the rod 467 through its various mountings, including the pivot 453 on the cross bar 429.

In using the splint of Figs. 56 to 66, as by way of example in reducing a fracture of a femur, the splint is applied to the patient in such manner that the countertraction means is located at the side of the superior fragment and the traction means is aligned with the distal fragment. For this treatment, the patient may be laid on a bed or a table with the limb extending beyond an edge and centrally overlying the horizontal frame of the splint as supported by cross bar 429. Adjustment of the post 424 in the standard 423 is made to bring the splint frame to proper height, and adjustment of sleeves 438 and 439 along rods 436 and 437 is made to give the countertraction and the traction devices proper spacing. The patient should be so placed that the femur will assume the position relative to the splint as indicated in Fig. 64 with the knee joint bent and the lower leg passing below the yoke 440. In this position the axial line of traction of the splint coincides with the anatomical axis of the femur.

When the splint is used with other long bones, the limb is so placed that the anatomical axis of the bone coincides with the axis of traction of the splint, which in this case, is coincident with the extended axial line of shaft 445.

In Fig. 60 I have shown a support which comprises a flat plate 474 which is fixed against horizontal movement on the upper end of a vertically threaded post 475. This post is slidably and rotatably contained in an opening 476 at the outer end of the cross bar 429, and it is raised or lowered by a nut 477 that is threaded onto the post and rests against the bar 429. The plate 474 is a support upon which the patient's buttock opposite the treated femur, rests, and it may be raised, lowered or turned to place it in the most practical position for the patient being treated.

Also, on the post is a block 478 by which a horizontal bar 479 is mounted for longitudinal adjustment and the outer end of the bar supports a troughed plate 480, shown in Figs. 57 and 59, to support the leg of the patient below the supported buttock.

The calf of the leg which is being treated may rest upon a supporting pad 481 carried by a support 482 as shown in Figs. 56, 57, and 59. This support comprises a U-shaped frame, having a pad 481 pivoted on the base portion, and the legs of the U slidably contained in clamp blocks 483 that are affixed by bolts 484 to the inside of the mounting ends of the yoke 440. When the bolts 484 are tightened, they hold the blocks in place and also clamp them against the supports 482 that are longitudinally slidable therein.

Means for and methods used in the securement of the fracture fragments to the traction and countertraction devices are best shown in Fig. 64 wherein 485 designates a universal rod clamp that is applied to one end of the cross rod 448. This clamp comprises two U-shaped clamp members, pivotally joined by a clamp bolt 486. One member is applied to the rod 448 and the other is applied to a short rod 487. Applied to rod 487 is a universal clamp 488 which is like clamp 485, and it comprises two U-shaped clamp members joined by a clamp bolt 489, one clamp member being mounted on rod 487 and the other mounts an extension rod 490 equipped at its outer end with a clamp head or block 491 in which the mounting shank 492 of a clamp 493 is slidably and rotatably contained. The clamp 493 mounts a short rod 494, and on this two pin clamps 495 are mounted to carry the transfixion pins 496, which are applied to the distal fragment.

For securement of the superior fragment in the splint (see Figs. 56, 60 and 64), a rod mounting clamp block 497 is fixed on the inner end of the rod 467, and this clamps a round rod 498 rigidly therein, in a position substantially perpendicular to the rod 467. Applied to the rod 498 are pin clamps 499 which mount the transfixion pins 496, which are applied to the superior fragment.

The rod clamps 485 and 488, and the pin clamps 495 and 499 preferably are of the character of those described and illustrated in my United States Letters Patent No. 2,185,322, and the transfixion pins are used therewith as described in that application, it being understood that the transfixions, for best holding results, are applied in pairs and in non-parallel relationship, with the point ends of the pins extended through the cortex that is opposite that from which the pin enters.

Obviously, much of the foregoing detailed description which has been given in connection with Figs. 56 to 66 of the drawings is equally applicable to the previously described forms of my invention and it is felt that the same need only be given in connection with one form of the invention. Also, the following description which is given in connection with Figs. 56 to 66 inclusive is likewise applicable to the previously described forms of my invention. Thus in the interest of brevity and also as this application is a continuation-in-part of Serial No. 449,647 which disclosed the structure of Figs. 56 to 66 inclusive, the description regarding mode of operation is set forth by way of example in connection with said figures.

Assuming the transfixions have been applied to the superior fragment, and that they have been secured to the rod 498 by the pin clamps 499, adjustment of the block 458 is then made along the rack bars 456 to bring the center of the block 458 in alignment with the axis of the bone fragment. To aid in so locating the block, a mark of some kind, such as a red dot, is placed on the rack bar 456 as indicated at the points Y in Fig. 60. Also, the bolt 470 is loosened to permit pivoting of blocks 465 on shaft 461, and the set screws 468 and 469 loosened. The rod 467 is then extended or adjusted for its fixation by clamp block 497, to the rod 498; these adjustments making possible the adaptation of the splint to children or adults, or persons who are fleshy or thin. After such fixation of the rod 467 to the rod 498, the set screw 468 is tightened, and this holds the rod 467 against endwise movement.

To facilitate the manual correction of angulation of the superior fragment after the transfixations have been applied thereto, and the rod 467 affixed to the rod 498, I have fitted a handle or lever arm 500 to the outer end of rod 467, as has been shown in Fig. 60. By this lever, the rod 467 may be rotatably actuated to swing the fragment up or down. The tightening of set screw 469 holds the position.

Assuming that transfixions have been applied as shown in Fig. 64, for the reduction of a fracture of a femur, and that connection with the splint has been made as therein shown, the clamps 485 and 488 are tightened to render the rods 448, 487 and 490 relatively rigid. Also, the clamp head or block 491 is set to hold the clamp 493 and rod 494 rigid relative to rod 487. In the technique now to be described, the pivot bolts 449 and 450 are left loose for free turning of the rod 448 and free pivotal action of the block 447. Rod 448, however, cannot move endwise. Also, set screw 446 is loosened for free turning of sleeve 444 in the bearing 443; it being remembered that shaft 445 is longitudinally slidable in the sleeve, but not rotatable therein. At the countertraction end of the splint, the locking bolt 455 is loosened for free oscillation of the arm 452 on pivot stud 453, and the screw 469 is loosened to permit rotation of the guide sleeve 466 of rod 467 in its support. Rotational correction of the superior fragment is then accomplished by turning hand wheel 463 to move the block 458 up or down along the rack bars 456. With this done, traction is then applied on the distal fragment by tightening the wing nut 451 on the shaft 445. As traction is applied, the fragments are drawn apart, and with breaks at certain levels (e. g. substantially centrally longitudinally of a long bone) the muscle and fascia pull operates to draw or mold the parts back to normal anatomical alignment. However, with breaks at the level indicated in Fig. 47, the technique follows that previously described. When the break is at the center level above mentioned and as the movement back to alignment is taking place, the shaft 445 is free to rotate, to permit rotative correction of the distal fragment while the pivoting of the traction unit on the bolt 449 and turning of the rod 448 in block 447 permits any correction of angulation which is necessary. If any additional correction of the superior fragment is required to correct any horizontal angulation this may be accomplished by swinging countertraction arm 452 horizontally on the pivot stud 453 to the extent and direction necessary to bring the fragment into proper, or normal alignment. Then bolt 455 is set to hold this adjustment. Vertical angulation, if necessary, may be then corrected by rotation of the rod 467 through the mediacy of hand lever 500. After the superior fragment has thus been properly positioned, wing nut or clamp screw 469 is tightened against the sleeve 466 to hold the rod 467 against turning. Previous to this, the set screw 468 has been tightened to hold the rod 467 against endwise shifting and the bolt 470 has been tightened to hold the position of block 465 in block 458. Thus the superior fragment may be brought to normal position and secured preparatory to final reduction and immobilization check-up.

After final check-up on both the superior fragment and the distal fragment and it has been ascertained that both bones are normally positioned or positioned as desired, the set screw 446 is tightened to hold the shaft 445 against turning, and the clamp bolts 449 and 450 are tightened, thus to hold the fracture fragments in proper relationship for immobilization of the fracture which may be accomplished in various ways, such, for example, as by applying a cast in which the transfixion units are embedded, or by applying a fixed, rigid rod connection between the bars or rods 494 and 498 of the transfixion unit.

In Fig. 64, I have indicated such a rod connection between the rods 494 and 498, wherein 501 designates a connecting rod joined at its ends by rod clamps 502 to the ends of rods 494 and 498 respectively. This form of connection is also fully described in my said Letters Patent previously mentioned.

The particular advantage of this mode of operation of the splint just described and the various splints or fracture table of this invention is that it operates in such a manner that through the application of traction and countertraction to overcome shortening, the fragments are automatically brought into proper alignment for fixation.

In the reduction of a fracture of a smaller bone, it is required that smaller rods and pins be used, and it is then convenient to employ the alternate type of pin mounting shown in Fig. 65, wherein 503 designates a small round rod on which pin clamps 504 are mounted to carry the pins 505. Rod 503 is functionally mounted by a split clamp bar 506, and this bar is equipped with a mounting cross rod 507, either end of which is applicable to the jaw socket of the clamp block 497. Thus, the smaller unit, comprising the bar or rod 503 and pins 505 is adapted to mounting in the bar or rod 467 which is designed for the mounting of a rod of the diameter of the cross rod 507.

In Fig. 66 there is shown an alternative skeletal fixation wherein pins 508 are extended through the bone and are mounted at both ends in supports fixed to rod 448. The pins 508 are placed through the fragment in non-parallel relationship, and are held at their ends in pin clamps 509 on rods 510 which, in turn, are secured by rod clamps 511 to rods 512. The rods 512 are mounted on cross bar 448 by rod clamps 513.

The skeletal connections used provide rigid holding connections with the traction and countertraction means, and in a sense, the latter serve as handles whereby the adjustment of the fragments to place them in correct apposition may be manually accomplished if desired. After the fragments have been brought into proper apposition, locking of units against movement will hold the fracture immobilized. Then with a connecting rod applied, such as rod 501 in Fig. 64, the patient may be removed from the splint on disconnection of the parts thereof from rods 494 and 498, and the fracture will be held immobilized and the patient will be ambulatory.

In connection with the structure of Figs. 56 to 66, I have discussed primarily the setting of a bone where the break is at the area substantially centrally of the bone length. In connection with previous figures I have discussed the setting of bones which are relatively close to the center of articulation of a long bone. It is to be understood, however, that all of the various devices illustrating my invention can operate on bones where the breaks are at different levels and it is to be understood that all of the various matters set forth in connection with Figs. 56 to 66 regarding skeletal fixation and transfixion unit likewise equally apply to the previous figures.

Obviously, changes may be made in the forms, dimensions, and arrangement of the parts of my invention, without departing from the principle thereof, the above setting forth only preferred forms of embodiment.

I claim:

1. In a fracture reducing mechanism a supporting frame means, a traction frame mounted on said supporting frame means for angular movements in horizontal and vertical planes about a common point; a traction unit mounted on said traction frame and remote from the mounting means of the traction frame; and a countertraction unit carried by said traction frame and mounted on the traction frame for angular movements in horizontal and vertical planes and for rotary movements all about said common point.

2. In a fracture reducing mechanism, a traction frame; a countertraction unit carried by said traction frame and mounted on the traction frame for at least angular movements in horizontal and vertical planes and for rotation about a common point; and a traction unit carried by said traction frame and mounted for angular movements in horizontal and vertical planes and for rotary movement about a second common point, which said second common point is aligned in a predetermined relation to the first mentioned common point.

3. In a fracture reducing mechanism a supporting frame means, a traction frame mounted on said supporting frame means for angular movements in horizontal and vertical planes about a common point; a countertraction unit carried by said traction frame and mounted on the traction frame for angular movement in horizontal and vertical planes and for rotary movement all about said common point; and a traction unit carried by said traction frame and mounted for angular movements in horizontal and vertical planes and for rotary movement about a second common point, which second common point is aligned in a predetermined relation to the first mentioned common point.

4. In a fracture reducing mechanism a supporting frame means, a traction frame; means mounting said traction frame on said supporting frame means for angular movement in a horizontal plane about a given point; means mounting said traction frame for angular movement in a vertical plane substantially about the same given point; and means to secure a limb to said traction frame with the center of articulation of the superior end of the bone involved substantially coinciding with said given point, whereby the traction frame may be moved angularly in a horizontal plane or angularly in a vertical plane and such angular movements of the traction frame and a limb so supported will be substantially about the center of articulation at the superior end of the limb.

5. In a fracture reducing mechanism, a countertraction device comprising a transfixion unit for rigid fixation to the superior fragment, and manually adjustable means mounting said transfixion unit for rotary and angular movements, whereby the said superior fragment may be manually adjusted to angularly and rotationally manipulate the superior fragment into a predetermined position; and a traction device disposed in longitudinal spaced relation to said countertraction device comprising a transfixion unit for rigid fixation to the distal fragment, traction means connected with said transfixion unit, rotatable mounting means freely rotatable when under tension for said transfixion unit axially aligned with the anatomical axis of the fractured bone as applied to the fracture reducing mechanism, locking means for said rotatable mounting means, means mounting said transfixion unit for angular movement thereof and of the distal fragment secured thereto, and locking means for said last mentioned mounting means, whereby upon substantial angular alignment of the distal fragment secured to the traction device with the superior fragment, there is permitted automatic, self-alignment and correction of displacement of the fragments incident to the application of reducing forces.

6. In a fracture reducing mechanism, a countertraction device comprising a transfixion unit for rigid fixation to the superior fragment, manually adjustable means mounting said transfixion unit for rotary and angular movements, and locking means for said manually adjustable means whereby the said superior fragment may be manually adjusted to angularly and rotationally manipulate the superior fragment into a predetermined position and locked in such position; and a traction device disposed in longitudinal spaced relation to said countertraction device comprising a transfixion unit for rigid fixation to the distal fragment, traction means connected with said transfixion unit, rotatable mounting means freely rotatable when under tension for said transfixion unit axially aligned with the anatomical axis of the fractured bone as applied to the fracture reducing mechanism, locking means for said rotatable mounting means, means mounting said transfixion unit for angular movement thereof and of the distal fragment secured thereto, and locking means for said last mentioned mounting means, whereby upon substantial angular alignment of the distal fragment secured to the traction device with the superior fragment, there is permitted automatic, self-alignment and correction of displacement of the fragments incident to the application of reducing forces.

7. In a fracture reducing mechanism, a countertraction device comprising a transfixion unit for rigid fixation to the superior fragment, and manually adjustable means mounting said transfixion unit for adjustment of said transfixion unit and the bone fragment secured thereto; and a traction device disposed in longitudinal spaced relation to said countertraction device comprising a transfixion unit for rigid fixation to the distal fragment, traction means connected with said transfixion unit, rotatable mounting means freely rotatable when under tension for said transfixion unit axially aligned with the anatomical axis of the fractured bone as applied to the fracture reducing mechanism, and means mounting said transfixion unit for angular movement thereof and of the distal fragment secured thereto, whereby upon substantial angular alignment of the distal fragment secured to the traction device with the superior fragment, there is permitted automatic, self-alignment and correction of displacement of the fragments incident to the application of reducing forces.

8. In a fracture reducing mechanism, a countertraction device comprising a transfixion unit for rigid fixation to the superior fragment, and manually adjustable means mounting said transfixion unit for adjustment of said transfixion unit and the bone fragment secured thereto; and a traction device disposed in longitudinal spaced relation to said countertraction device comprising a transfixion unit for rigid fixation to the distal fragment, traction means connected with said transfixion unit, rotatable mounting means freely rotatable when under tension for said transfixion unit which includes a shaft axially aligned with the anatomical axis of the fractured bone as applied to the fracture reducing mechanism, and means mounting said transfixion unit for angular movement thereof and of the distal fragment secured thereto, whereby upon substantial angular alignment of the distal fragment secured to the traction device with the superior fragment, there is permitted automatic, self-alignment and correction of displacement of the fragments incident to the application of reducing forces.

9. In a fracture reducing mechanism, a countertraction device comprising a transfixion unit for rigid fixation to the superior fragment, and manually adjustable means mounting said transfixion unit for adjustment of said transfixion unit and the bone fragment secured thereto; and a traction device disposed in longitudinal spaced relation to said countertraction device comprising a transfixion unit for rigid fixation to the distal fragment, traction means connected with said transfixion unit, rotatable mounting means freely rotatable when under tension for said transfixion unit axially aligned with the anatomical axis of the fractured bone as applied to the fracture reducing mechanism, and means mounting said transfixion unit for angular movement thereof in two planes at right angles to each other and of the distal fragment secured thereto, whereby upon substantial angular alignment of the distal fragment secured to the traction device with the superior fragment, there is permitted automatic, self-alignment and correction of displacement of the fragments incident to the application of reducing forces.

10. In a fracture reducing mechanism, a frame means; a sleeve rotatable in said frame means; a traction screw non-rotatively supported by said sleeve for longitudinal movement in said sleeve; and nut means on said screw, whereby the traction screw is freely rotatable with said sleeve and longitudinally movable therein.

11. In a fracture reducing mechanism, a frame means; a sleeve rotatable in said frame means; a traction screw mounted in said sleeve and non-rotatable in said sleeve and longitudinally movable in said sleeve; nut means on said screw; and releasable locking means disposed between the frame and the sleeve, whereby said screw is always freely movable longitudinally by turning said nut means and said sleeve and screw jointly may be locked against rotation or jointly may be free to rotate in said frame means.

12. In a fracture reducing mechanism, frame means; a traction frame for a single limb; bracket pivoted to said frame means and angularly movable in a horizonal plane about a predetermined vertical axis; an arcuate bar connected with said traction frame and slidingly connected with said bracket for angular movement of the arcuate bar and the traction frame connected therewith in a vertical plane about a horizontal axis which is the center of curvature of the bar and which intersects said vertical axis, whereby is provided vertical and horizontal angular movements of the traction frame about the point of intersection of said axes and vertical and horizontal angular movement of a limb therein about a given point.

13. In an orthopedic mechanism, a sacral rest post; a lower horizontal arm connected to and extending in one direction therefrom; a vertical arm connected to said lower horizontal arm; an upper horizontal arm connected to said vertical arm and extending over said lower horizontal arm; and a detachable casette holder carried by the lower horizontal arm and positioned with its deck portion in predetermined spaced relation to the upper surface of the upper horizontal arm, whereby the spacing between the horizontal arms may be such as to permit ready applications of bandages or casts passing therethrough and about the upper horizontal arm and the casette holder can be attached when desired and at a predetermined level in relation to the upper surface of the upper horizontal arm.

14. In an orthopedic mechanism, a sacral rest post; a detachable horizontal arm angularly adjustable on said post; means to secure said arm to said post in adjusted positions; a plurality of sacral rest receiving means in said arm; and a detachable sacral rest interfitting with said sacral rest receiving means, whereby the sacral rest may be offset from the sacral rest post.

ROGER ANDERSON.

REFERENCES CITED

The following references are of record in the file of this patent:

UNITED STATES PATENTS

| Number | Name | Date |
| --- | --- | --- |
| 943,827 | Hennessy | Dec. 21, 1909 |
| 2,185,322 | Anderson | Jan. 2, 1940 |
| 2,198,871 | Haboush | Apr. 30, 1940 |
| 2,217,783 | Bell | Oct. 15, 1940 |